United States Patent [19]

Power et al.

[11] Patent Number: 5,745,377
[45] Date of Patent: Apr. 28, 1998

[54] METHOD AND APPARATUS FOR DETERMINING QUANTITY OF LIQUID IN A CONTAINER AND/OR LACK OF MOTION THEREOF

[75] Inventors: Wendy Power, Westford; Michael A. Reed, Chelmsford, both of Mass.; Dominick J. Frustaci, Williamsville, N.Y.; Gerald Larocque, Bedford; Brenda Marchetti, Plainville, both of Mass.

[73] Assignee: Figgie International Inc., Willoughby, Ohio

[21] Appl. No.: 406,508

[22] Filed: Mar. 20, 1995

[51] Int. Cl.$^6$ ........................................... G01F 23/26
[52] U.S. Cl. ............... 364/509; 73/1.73; 73/1.75; 73/304 C; 364/559
[58] Field of Search ............... 73/304 C, 290 R, 73/149, 1 D, 1 H, 510, 500, 514.05, 1.73, 1.75; 33/366, 365, 377; 367/908; 340/612, 618, 620, 689, 686; 361/276, 284; 324/663, 664, 686, 684; 364/509, 566, 559; 116/109; 200/61.45 R, 61.52

[56] References Cited

U.S. PATENT DOCUMENTS

| | | | |
|---|---|---|---|
| 3,943,767 | 3/1976 | Efferson | 73/295 |
| 4,020,690 | 5/1977 | Samuels et al. | 73/299 |
| 4,428,232 | 1/1984 | Tanaka et al. | 73/304 |
| 4,589,077 | 5/1986 | Pope | 364/509 |
| 4,844,117 | 7/1989 | Sung | 137/386 |
| 4,873,832 | 10/1989 | Porter | 62/49 |
| 4,912,662 | 3/1990 | Butler et al. | 364/559 |
| 5,018,387 | 5/1991 | Myneni | 73/295 |
| 5,095,747 | 3/1992 | Smith | 73/290 |
| 5,114,907 | 5/1992 | Erwin et al. | 505/1 |
| 5,138,880 | 8/1992 | Lee et al. | 73/304 C |
| 5,167,154 | 12/1992 | Lee | 732/295 |
| 5,230,439 | 7/1993 | Klok et al. | 220/420 |
| 5,357,758 | 10/1994 | Andonian | 62/45.1 |
| 5,423,214 | 6/1995 | Lee | 73/304 C |

*Primary Examiner*—Emanuel T. Voeltz
*Assistant Examiner*—Tony M. Cole
*Attorney, Agent, or Firm*—Hodgson, Russ, Andrews, Woods & Goodyear LLP

[57] ABSTRACT

A sensor apparatus is described that detects and indicates the volume of cryogenic liquid in a Dewar container independent of the spatial orientation and physical motions acting on the Dewar container. The sensor apparatus comprises a first conductor, preferably positioned adjacent to the container inner shell wall and a second conductor comprising a plurality of axially spaced and concentric endless conductor bands mounted inside the container in a proximately spaced and a parallel relationship with respect to the first conductor. The second conductor bands divide the first conductor into zones that provide a plurality of distinct and separate capacitors. A computer measures the capacitance of each capacitor and compares the individual capacitance measurements to reference capacitance values corresponding to a known volume of cryogenic fluid filled in the container at known angles of inclination.

30 Claims, 7 Drawing Sheets

METHOD AND APPARATUS FOR DETERMINING QUANTITY OF LIQUID IN A CONTAINER AND/OR LACK OF MOTION THEREOF

BACKGROUND OF THE INVENTION

1. Field of the Invention

The present invention relates generally to a method and apparatus for detecting the quantity of liquid in a container such as a cryogenic liquid Dewar container independent of the spatial orientation and physical motions acting on the container and/or for indicating the absence of motion imparted to the container.

The capacitance between two conducting members is proportional to the amount of opposite and therefore mutually attractive electrical charges that can be gathered on the conductors in the presence of an electrical potential differential. The resulting electric field that is set up between the conductors holds the opposite charges captive. The electrical storage capacity of an electrical capacitor can be changed by placing a foreign material between the conductors. Materials which have this property of changing the effective field strength and therefore the amount of electrical charge that is held on proximately spaced conductors are known as dielectrics. The ability of a particular dielectric medium to cause an increase in the charge holding capacity of conductors in response to a similar applied electric potential differential placed on a capacitor is characteristic of the medium's dielectric coefficient, i.e., the ratio of the charge holding capacity or capacitance when the conducting members are separated by the foreign material or dielectric medium and when the conductors are separated by vacuum. In the present invention, dielectric coefficients can range from about one for ambient air to as high as 80 for distilled water.

2. Prior Art

The measurement of capacitance between two proximately spaced conductors having a known dielectric medium therebetween is a well known technique that is extensively used in the gauging of a liquid level. U.S. Pat. No. 4,589,077 to Pope describes a liquid level measuring apparatus for a tank comprising an elongated multi-stage capacitance probe that includes a column of capacitors extending in a known direction through the liquid interface. By identifying the capacitor in the column at the liquid level and the capacitor directly below the liquid level, the height of the liquid level within the tank is computed. If the volume of the tank is known, as a function of height, the volume of liquid remaining in the tank can also be computed. This measuring apparatus requires that the tank be motionless and of a known relative orientation.

U.S. Pat. No. 4,428,232 to Tanaka et al. describes a capacitance liquid level detector comprising a pair of helically coiled electrodes extending vertically in a container and at least partially submerged in a liquid stored therein. The upper and lower ends of the coils are connected to the respective ends of the container. An oscillator circuit of the resistance capacity type having a variable condenser consisting of the electrodes is arranged to oscillate at a frequency that is dependent upon the variation of the electrostatic capacitance between the electrodes so as to indicate the level of the stored liquid. This detector apparatus requires that the storage container be motionless and of a known relative orientation.

Another type of cryogenic liquid level detector apparatus is set forth in U.S. Pat. No. 3,943,767 to Efferson. This patent describes a detector apparatus system that comprises a filament of superconducting material vertically positioned inside the Dewar. A current is passed through the filament and as the gas-liquid interface moves along the filament, the voltage generated is a measure of the level of the gas-liquid interface. This measuring apparatus also requires that the tank remain motionless during the measurement and have a known relative orientation. Finally, U.S. Pat. No. 5,230,439 to Klok et al. describes a level detector comprising two elongated and parallel electrodes disposed inside a container. The electrodes are energized to provide a liquid level signal. This detector is not particularly useful for a container in motion and there is no means for indicating the inclination of the container.

A series of electrodes wrapped in a spiral pattern around a pipe along a portion of the length thereof has been suggested for the purpose of capacitance sensing of gaseous fraction in two-phase flow of a fluid through the pipe. See "Capacitive Sensing of Gaseous Fraction in Two-Phase Flow," NASA Tech Briefs, January, 1995.

As previously mentioned, the sensor apparatus of the present invention is also useful for indicating the absence of motion imparted to the container by indicating the change in inclination, or lack thereof, between two measurement events. An exemplary inclinometer according to the prior art is shown in U.S. Pat. No. 4,912,662 to Butler et al. Various commercially available devices have been provided for the purpose of functioning to signal "man-down".

SUMMARY OF THE INVENTION

The present invention provides a sensor apparatus comprising detector means for detecting, measuring and outputting the quantity of liquid contents in a container, preferably a cryogenic liquid Dewar container, independent of the spatial orientation and physical motions acting on the Dewar container. Also, by appropriate manipulation of the various measurements used to determine the liquid quantity independent of spatial orientation, the absence of motion imparted to the container is determined.

The present detector means comprise capacitor means having a first conductor means, preferably comprising the inner container wall, or a conductive member positioned adjacent to the container inner shell wall and a second conductor means preferably comprising a plurality of axially spaced and concentric conductor bands mounted inside the container in a proximately spaced and parallel relationship with respect to the first conductor means. Each conductor band serves as a separate and distinct capacitor formed by that portion of the proximately spaced first conductor means disposed adjacent to the individual conductor band. A computer calculates the capacitance value of each capacitor formed by the individual conductor bands and the adjacent portion of the first conductor means, independent of the other bands, and compares these capacitance measurements to a set of reference capacitance values corresponding to a known volume of cryogenic liquid in the container at a known inclination.

In the case of a Dewar container having a quantity of liquefied-gas as the cryogenic liquid, such as liquid air made up of a ratio of liquid oxygen and liquid nitrogen, the capacitance value is influenced by the amount of liquid phase air that is present in the space provided between the first and second conductor means. The dielectric coefficient for the liquid phase of oxygen and nitrogen is approximately 1.5 times greater than the value for the gas phase for each molecular constituent. This property causes the capacitance value to change by the same ratio when the space between the conductors comprising the capacitor means is partially filled with the cryogenic liquid in comparison to a base level or reference capacitance taken when the entire volume is filled with air as a gas. The reference capacitance can relate to any known value with which other capacitance measurements can be compared. The magnitude of the capacitance value differential is directly related to the quantity of the liquid between the conductors comprising the capacitor means, and therefore provides an indication of the quantity of liquid in the container.

The differential capacitance values are also useful for indicating the extent of physical activity of the user of the container. Regardless of whether the user is active or incapacitated, the respective capacitance measurements taken at spaced intervals of time will each indicate a capacitance. When the plurality of sequential capacitance measurements fall outside of a narrow deviation band or "window," it is interpreted that the user is active and therefore does not require assistance. However, when the capacitance measurements settle into the narrow deviation window and remain there for a predetermined period of time, a man-down event is triggered to indicate that the user of the container is not active, and may in fact be in peril.

The foregoing and additional advantages are characterizing features of the present invention that will become clearly apparent upon a reading of the ensuing detailed description together with the included drawings wherein:

BRIEF DESCRIPTION OF THE DRAWINGS

FIG. 5 is an enlarged detailed view of a portion of the cryogenic liquid Dewar container 10 shown in FIG. 2.

DETAILED DESCRIPTION OF THE INVENTION

Turning now to the drawings, FIGS. 1 to 6 show a sensor means according to the present invention that is disposed inside a Dewar container 10 to detect and indicate the quantity of cryogenic fluid remaining in the Dewar. It should be understood that container 10 is merely exemplary and represents one embodiment of a container that is useful with the sensor means of the present invention. In that respect, the present sensor means is useful with many types of containers whose shape and construction are only limited by the imagination of those skilled in the art. For example, while container 10 is shown having a generally cylindrical shape closed at both ends, the present sensor means can be adapted for use with containers having a myriad of shapes other than cylindrical and the container need not be closed.

The sensor means will be described in detail hereinafter, but first the structure of container 10 is described.

Figure 1:
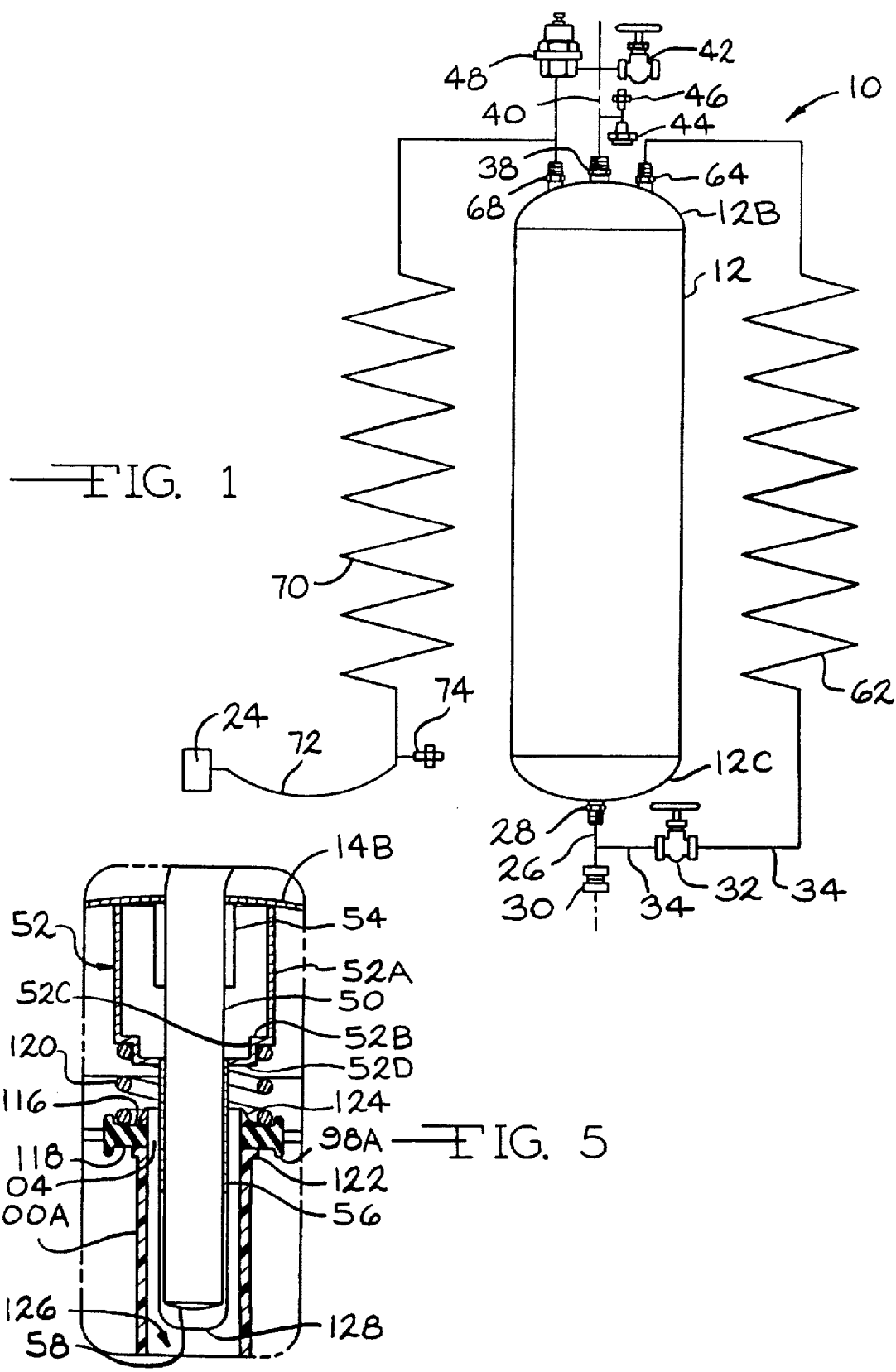
FIG. 1 is a perspective view, partly in schematic, of a cryogenic liquid Dewar container 10 for use with a liquid quantity sensor of the present invention.

Container 10 is shown in FIG. 1 partly in perspective view, partly in schematic and comprises an outer container means or outer shell 12 mounted around and surrounding an inner container means or inner shell 14 (FIG. 2) provided with a cryogenic liquid 16 such as a quantity of liquefied-gas. As shown in cross-section in FIG. 2, the outer shell 12 includes a generally cylindrical side wall 12A extending along and around the longitudinal axis of the container 10 with first and second dome portions 12B and 12C closing the opposed ends thereof. Similarly, the inner shell 14 has a cylindrical sidewall 14A extending along and around the longitudinal axis with first and second dome portions 14B and 14C closing the opposed ends thereof.

Figure 2:
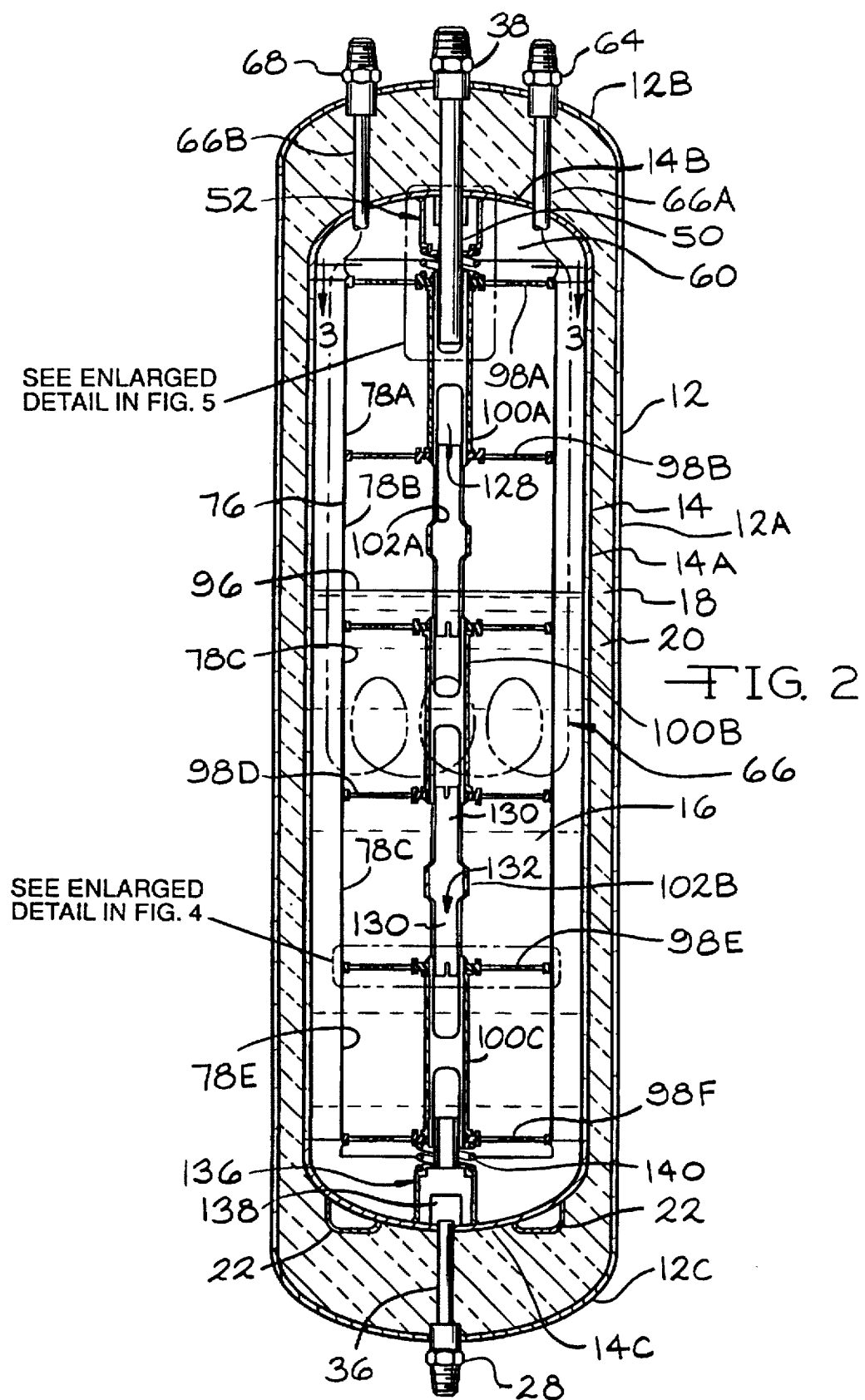
FIG. 2 is a partly schematic and partly cross-sectioned view showing the cryogenic liquid Dewar container 10 of the present invention shown in FIG. 1.

As further shown in FIG. 2, the space 18 formed between the inner and outer shells 12 and 14 is evacuated and provided with an insulation material 20 that helps thermally insulate the cryogenic liquid 16. A getter material 22 is mounted on the outside of the second dome 14C to absorb any residual gas molecules in the evacuated space 18 between the shells 12 and 14. Often the cryogenic liquid 16 is a liquefied air mixture having an enriched oxygen concentration that serves to supply breathable air to a pressure regulator and associated facepiece 24 (shown in block representation in FIG. 1), as is well known to those of ordinary skill in the art.

As shown schematically in FIG. 1, an input/output fluid conduit 26 extends from a threaded nipple 28, or a similar coupling means mounted on the second dome 12C of outer shell 12. Conduit 26 leads to a quick-disconnect coupling 30 that serves as a connection means for connecting the Dewar container 10 to a pressurized liquefied-gas supply (not shown) for filling the cryogenic liquid 16 into inner shell 14. A manual shut-off valve 32 is connected to the input/output conduit 26 between nipple 28 and coupling 30 via conduit 34. The pressure of the cryogenic liquid 16 inside the inner shell 14 is preferably held at a minimum of about 60 psi.

As shown in FIG. 2, nipple 28 leads inside the outer shell 12 to a conduit 36 extending through the evacuated space 18 to enter the inner shell 14 in communication with the contents contained therein. Similarly, the first dome 12B of the outer shell 12 is provided with an axially positioned threaded nipple 38, that serves to connect Dewar container 10 to exterior components located outside the enclosure of the outer shell 12. As particularly shown in FIG. 1, nipple 38 is connected by an outlet conduit 40 to a vent valve 42, burst disk 44, a pressure relief valve 46, and an economizer valve 48.

As shown in FIG. 2, nipple 38 leads inside the outer shell 12 to a relatively thin walled conduit 50 entering the inner shell 14 along the longitudinal axis thereof. A relatively thick walled stand-off 52 is mounted on the inside of the first dome 14B, coaxially around conduit 50. Stand-off 52 is shown in enlarged detail in FIG. 5 and comprises a first, large diameter cylindrical portion 52A extending to a first web portion 52B that forms into a second, lesser diameter ring portion 52C. Ring portion 52C in turn extends to a second web 52D that completes stand-off 52. A pair of diametrically opposed openings 54 (only one shown) having a generally square shape, are provided through cylinder portion 52A to provide for fluid flow into and out of the enclosure of the stand-off 52. An inner annular circumference of second web 52D connects to a relatively thin-walled, low thermal conductivity sleeve 56 (FIG. 5) fitted around the outside wall of a portion of conduit 50 in a closely spaced relationship therewith. Stand-off 52 thereby provides support for conduit 50 which in turn provides a low thermal conductivity passage from the evacuated space 18 into the inner shell 14.

Conduit 50 is provided with an open terminal end 58. This provides a sufficient vent space at the upper portion of the inner shell 14 above the opening 58 where a gas pocket 60 (FIG. 2) forms that prevents the inner shell 14 from being overfilled with cryogenic liquid 16. In that respect, when Dewar container 10 is being filled with cryogenic liquid 16 and with valve 42 (FIG. 1) turned to an open position, at such time as liquid 16 blows out through valve 42, the container 10 is filled to the prescribed level as defined by opening 58 in conduit 50. The terminal opening 58 of conduit 50 also provides for passage of conducting wires (not shown) connected to the sensor means of the present invention by hermetic connectors having compression glass seals (not shown), as is well known to those skilled in the art. The sensor means will be explained in detail presently.

As schematically shown in FIG. 1, one end of conduit 34 intersects input/output conduit 26 while the other end leads to a first endothermic heat exchanger 62 mounted outside Dewar container 10. Heat exchanger 62 serves to conduct heat energy from the ambient surroundings to the cryogenic liquid 16, which preferably is liquefied air, to vaporize the liquid to a gas and then to warm the gas. The warmed gas then leaves the first endothermic heat exchanger 62 and re-enters the first dome 12B of the outer shell 12 through threaded nipple 64 leading to an inlet conduit 66A of an internal exothermic heat exchanger 66 (FIG. 2) provided inside inner shell 14. Exothermic heat exchanger 66 is shown schematically in FIG. 2 and it serves to conduct a portion of the heat energy imparted to the warmed gas by the first endothermic heat exchanger 62 to the cryogenic liquid 16 remaining inside the inner shell 14.

The outlet conduit 66B of the exothermic heat exchanger 66 connects to a threaded nipple 68 mounted on the first dome 12B. Nipple 68 in turn leads to a second endothermic heat exchanger 70, shown schematically in FIG. 1, which is similar to the first endothermic heat exchanger 62. When the warmed gas leaving the first endothermic heat exchanger 62 moves through the exothermic heat exchanger 66, heat energy is conducted to the cryogenic liquid 16 inside the inner shell 14. The temperature of the gas in heat exchanger 66 is cooled an amount dependent on the flow rate, and the heat energy of the cryogenic liquid 16 inside inner shell 14 is raised a like amount. The cooled gas leaving the internal exothermic heat exchanger 66 then moves to the second endothermic heat exchanger 70, which serves to warm the gas to about ambient temperature. An outboard end of the second endothermic heat exchanger 70 preferably connects to a flexible tube 72 that supplies the warmed gas to the pressure regulator and an associated on-demand facepiece 24 (shown in block representation in FIG. 1), which is worn by a user breathing the air. A pressure relief valve 74 is provided adjacent to the outboard end of the second endothermic heat exchanger 70.

FIGS. 2 to 6 further show the sensor means of the present invention for detecting and indicating the quantity of cryogenic liquid 16 in the inner shell 14 of Dewar container 10, independent of the physical motions acting on the container, and independent of the spatial orientation of the container. It should be understood that the sensor means of the present invention is useful for detecting and indicating the liquid quantity in various types of containers and that the sensor means is shown associated with the previously described cryogenic Dewar container 10 by way of example, not limitation.

The liquid quantity sensor of the present invention will first be described in general terms and later in detail.

Figure 6:
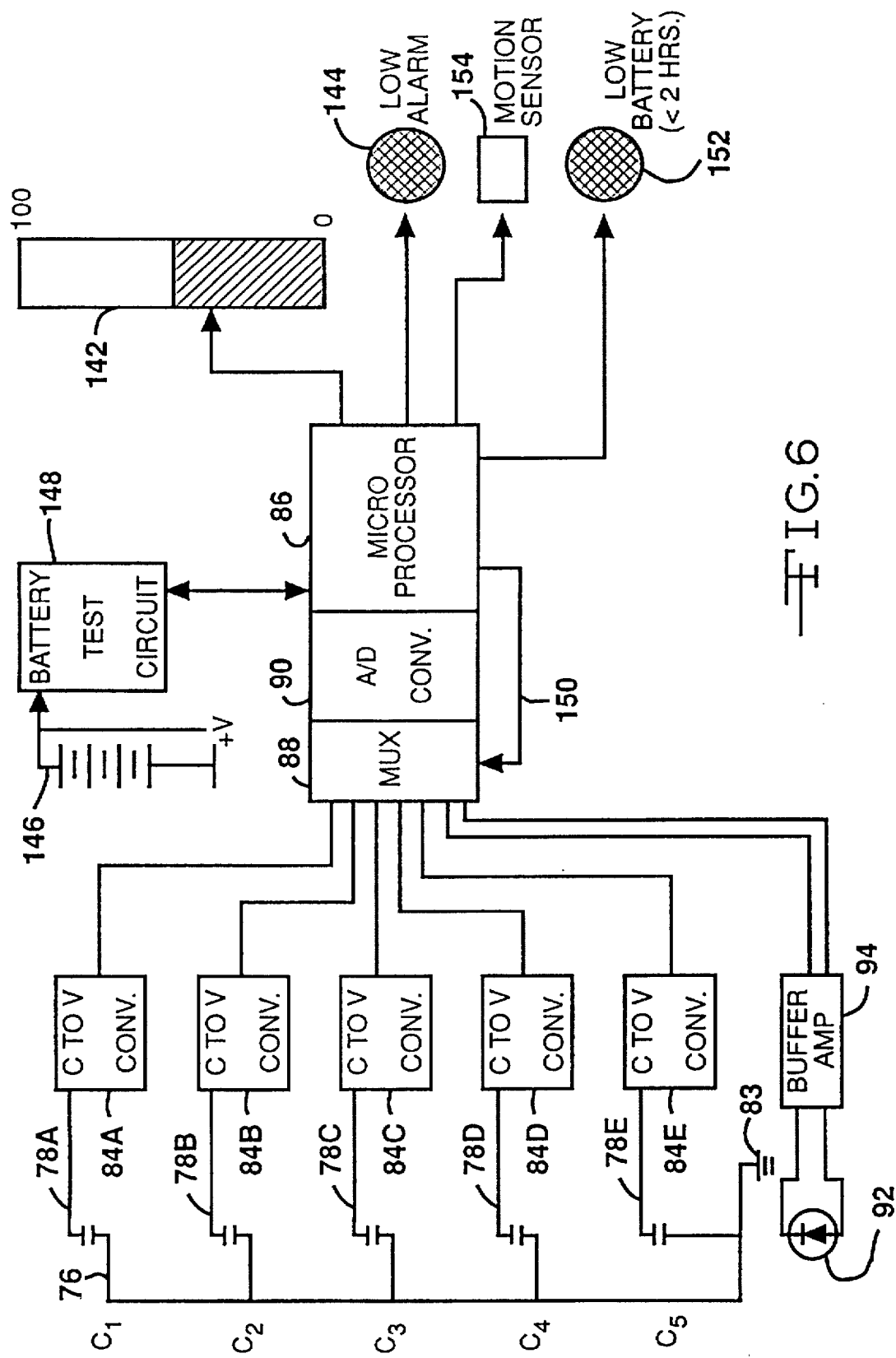
FIG. 6 is a block diagram of the cryogenic liquid quantity sensor of the present invention.

As shown diagrammatically in FIG. 6, the quantity of cryogenic liquid 16 is determined by a capacitance based sensing apparatus using a first, cylindrically shaped conductor 76 (FIGS. 2 to 4 and 6) extending along and around the longitudinal axis of container 10 from adjacent to dome 14B of inner shell 14 to a position adjacent to dome 14C, and a plurality of independent conductor bands, indicated as bands 78A to 78E, that together serve as a second conductor means. The conductor 76 and bands 78A to 78E are preferably made of a conductive mesh material that readily enables cryogenic fluid 16 to flow into and out of the space therebetween.

The conductor 76 and bands 78A to 78E can be discontinuous or they can be endless, the former being preferred. As shown in cross-section in FIG. 3, a clearance 80 is preferably provided between the proximate ends of conductor 76 and a clearance 82 is preferably provided between the proximate ends of exemplary band 78A. This prevents buckling and distortion in the conductor 76 and bands 78A to 78E due to temperature variations. What is important is that there is established a substantially uniform electric field generated between conductor 76 and bands 78A to 78E, as will be explained in detail hereinafter. It should also be understood that the clearances 80, 82 are preferably offset with respect to each other so that there is no overlap. This construction helps to minimize the effect the clearances may have on the capacitance measurements made of the generated electric field.

First conductor 76 is mounted inside the inner shell 14 in a coaxial relationship with respect to the longitudinal axis thereof and parallel with respect to the side wall 14A. Conductor 76 is connected to an electrical ground, schematically shown in FIG. 6 at 83, and each of the independent conductor bands 78A to 78E are provided in a proximately spaced and parallel relationship with respect to the first conductor 76 such that each band 78A to 78E "covers" a respective zonal area of the inner surface of first conductor 76 with the gap therebetween remaining relatively small and constant to comprise the capacitance means of the present invention. That way, independent of the spatial orientation of the Dewar container 10, the cryogenic liquid 16 immerses some portion of at least one or more of the independent conductor bands 78A to 78E to serve as a dielectric thereof and change the respective capacitance measurements $C_1$ to $C_5$ of that portion of each of the immersed bands with respect to predetermined baseline capacitance measurements. For example, in the case of the baseline capacitance being derived from an inner shell 14 filled with gas in comparison with the inner shell 14 partially filled with cryogenic liquid 16, the latter capacitance measurement increases due to the greater dielectric constant of the cryogenic liquid 16 versus gas. The magnitude of the capacitive increase is proportionate to the area of each of the various independent bands 78A to 78E immersed in the fluid 16.

As shown in block diagram in FIG. 6, the respective capacitance measurements $C_1$ to $C_5$ derived from each of the plurality of conductor bands 78A to 78E, which divide the area of first conductor 76 into capacitor zones, are fed to respective convertors 84A to 84E. Convertors 84A to 84E in turn respectively send an amplified proportionate voltage measurement to a micro-processor 86 via a multiplexer and an analogue-to-digital convertor, indicated as blocks 88 and 90 respectively. Micro-processor 86 serves as a computer means to process this data along with an input from a cryogenic liquid temperature sensor, indicated as component 92 in FIG. 6, to provide a calculated cryogenic liquid quantity. The temperature measurement is fed to a buffer unit, indicated as block 94 in FIG. 6, and then to computer 86 via multiplexer 88 and A/D convertor 90.

The temperature of the cryogenic liquid is used to correct the calculated liquid quantity and provide a corrected liquid quantity, indicated at 96 in FIG. 2. For example, when the cryogenic liquid 16 comprises a mixture of oxygen and nitrogen, ($O_2/N_2$), the dielectric constant of $O_2/N_2$ is a function of the temperature of the liquid and consequently, the capacitance measurements $C_1$ to $C_5$ will change with the liquid temperature for a fixed zonal coverage ratio. From this temperature measurement, and with the volumetric configuration of Dewar container 10 known, the quantity of cryogenic liquid 16 in the Dewar container 10 can be accurately determined. Also, since the quantity of cryogenic liquid 16 is determinable at any one time by manipulation of the independent capacitance measurements $C_1$ to $C_5$, as described above, the change in cryogenic quantity or a differential quantity measurement is determined by measuring the relative change in the capacitance measurements $C_1$ to $C_5$ from a first reading to a second reading.

As will be explained in detail hereinafter, a database stored in the computer 86 is provided with data tables having reference capacitance values for various percent fill quantities of the cryogenic liquid 16 at various inclinations. Since the area of cryogenic liquid 16 in contact with each of the conductor bands 78A to 78E can be measured independently, the inclination of the Dewar container 10 can be determined without the need of an associated inclinator. Change in inclination is calculated by measuring the relative change in capacitance of each band 78A to 78E from a first capacitance reading taken at a first inclination to a second capacitance reading taken at a second inclination. The calculation of the cryogenic liquid 16 quantity derived from the contact area of the cryogenic liquid 16 and the capacitance means, and the calculation of the inclination of the Dewar container 10 will now be explained in greater detail.

As shown in cross-sectional detail in FIGS. 2 to 5, the zonal capacitance measurement system of the present invention is derived from the plurality of conductor bands 78A to 78E aligned in series inside inner shell 14 with each band being in a proximately spaced and parallel relationship with respect to the cylindrically shaped first conductor 76. Conductor 76 is maintained in its parallel relationship with respect to the side wall 14A of the inner shell 14 by a network of insulators 98A to 98F locked to alternating female spacers 100A to 100C and spacers 102A and 102B separated by alternating and interconnecting male spacers 102A and 102B. Insulators 98A to 98F, spacers 100A to 100C and spacers 102A and 102B are made of a non-conductive material having a similar coefficient of thermal expansion as conductors 76 and 78A to 78E. This ensures that the gap between conductor 76 and conductors 78A to 78F is maintained at a constant distance of about 0.020 inches at the approximate −280° F. operating temperature for Dewar container 10. Additionally, constructing these components of a non-conductive material eliminates any undue stress forces on the components, i.e., 76, 78A, 98A to 98F, 100A to 100C, and 102A and 102B which are assembled into the inner shell 14 at about 70° F., when they are contacted by the cryogenic liquid 16. The preferred material for insulators 98A to 98F and spacers 100A to 100C and 102A and 102B is TORLON® thermoplastic polymer, which has a similar coefficient of thermal expansion as type 316 stainless steel used for conductors 76 and 78A to 78E.

Figure 3:
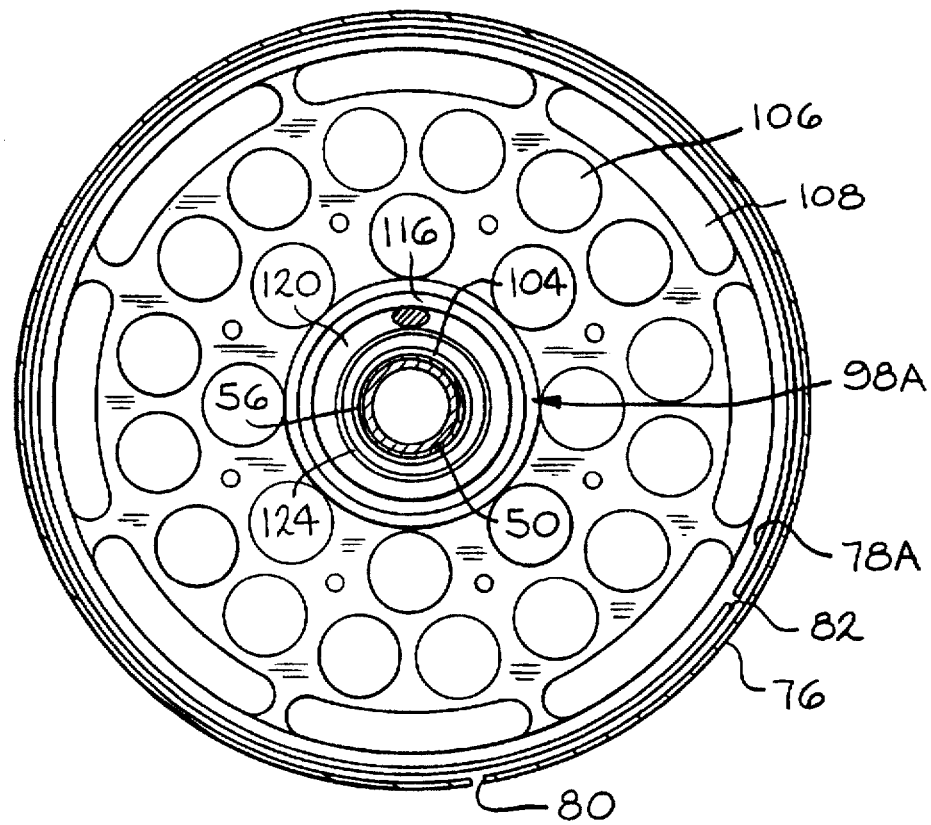
FIG. 3 is a cross-sectioned view along line 3—3 of FIG. 2.

Insulator 98A, shown in plan view in FIG. 3, is representative of the other insulators 98B to 98F and it has a circular shape provided with a central circular opening 104 and a pattern of secondary openings having circular shapes 106 and somewhat elongate banana shapes 108. The openings 106 and 108 allow for cryogenic liquid 16 flow from one side of the various insulators to the other side.

Figure 4:
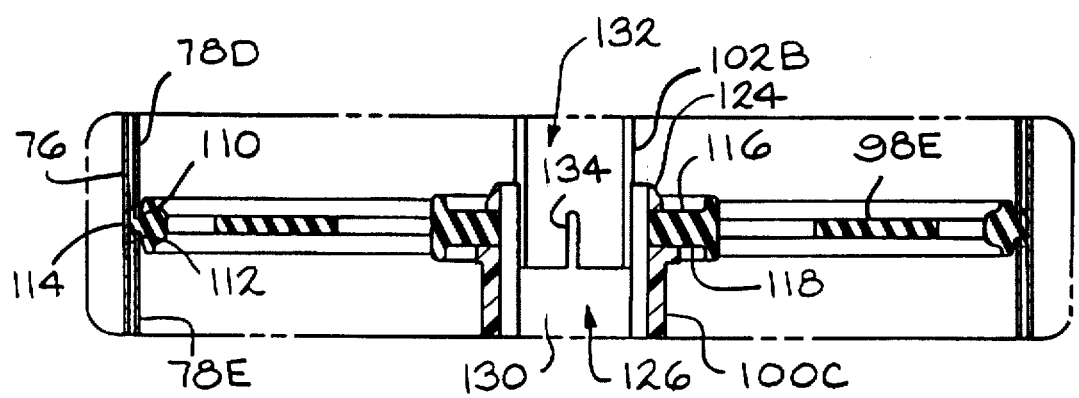
FIG. 4 is an enlarged detailed view of a portion of the cryogenic liquid Dewar container 10 shown in FIG. 2.

FIG. 4 shows an enlarged cross-section of a representative insulator 98E having an outer circumference provided with opposed annular channels 110 and 112 and an intermediate annular protrusion 114. A cylindrical outer face of protrusion 114 contacts conductor 76 while the inner portion of insulator channel 110 provides a seat that receives one of the annular edges of conductor band 78D and insulator channel 112 provides a seat that receives an adjacent one of the annular edges of conductor band 78E.

As further shown in FIGS. 2 and 5, the inner annular circumferential portion of insulator 98A surrounding central circular opening 104 has a T-shaped cross-section aligned normal to the axis of container 10 to provide opposed inner ledges 116 and 118. Ledge 116 receives one end of a coil spring 120 seated therein and biasing between insulator 98A and the annular ledge formed by the outer junction between web portion 52B and ring portion 52C of stand-off 52.

The opposite ledge 118 of insulator 98A serves as a seat for an annular rim 122 formed at the first end of female spacer 100A received in central opening 104 of insulator 98A. The first end of spacer 100A further includes an annular extending tab 124 that hooks over and around the first ledge 116 of insulator 98A adjacent to coil spring 120. That way, annular rim 122 in conjunction with tab 124 contacting the opposed ledges 116 and 118 lock insulator 98A to spacer 100A. While it is not shown in enlarged detail in FIG. 2, the opposed end of spacer 100A is received in a central opening in second insulator 98B and has a similar rim and tab structure that together lock spacer 100A to insulator 98B in a similar manner as spacer 100A is locked to insulator 98A. From FIG. 2, it can further be seen that the opposed ends of the second female spacer 100B similarly lock to insulators 100C and 100D, and that the opposed ends of the third female spacer 100C similarly lock to insulators 98E (FIG. 4) and 98F.

First spacer 100A is further provided with a central passage 126 (FIG. 2 and 5) extending along and around the longitudinal axis of container 10 between opposed open ends provided adjacent to and between the first and second insulators 98A and 98B. Two pairs of opposed U-shaped openings 128 extend from each open end thereof towards the middle portion of spacer 100A. Openings 128 communicate with passage 126 centrally located through spacer 100A to provide for flow of cryogenic liquid 16 into and through spacer 100A. As further shown in FIG. 5, a portion of the low thermal conductivity sleeve 56 fitted around the outside wall of a portion of conduit 50 is itself fitted inside the inner wall of spacer 100A such that conduit 50 is positioned inside passage 126 and in coaxial alignment therewith. That way, cryogenic liquid 16 contained inside inner shell 14 is able to flow through the U-shaped openings 128 in spacer 100A in communication with passage 126 and into opening 58 in conduit 50 during filling of Dewar container 10 with cryogenic liquid 16, as previously discussed.

Second insulator 98B is further provided with an outer annular circumference having opposed annular channels 110, 112 similar to channels 110 and 112 of first insulator 98A. The opposed annular channels 110, 112 of insulator 98B receive the adjacent annular edges of first and second conductor bands 78A and 78B, respectively. Thus, first conductor band 78A is held in its proximately spaced and parallel relationship with respect to conductor 76 seated in the annular channels 112 and 110 of respective first and second insulators 98A and 98B while insulators 98A and 98B are in turn secured in place by their locking engagement with the opposed ends of spacer 100A.

Male spacer 102A is shown in FIG. 2 having its opposed ends fitted inside female spacers 100A and 100B and male spacer 102B has its opposed ends fitted inside female spacers 100B and 100C. A portion of representative male spacer 102B is shown in enlarged detail in FIG. 4. Male spacer 102B has a generally cylindrical shape provided with two pairs of opposed U-shaped openings 130 that extend from each open end thereof towards the middle portion of spacer 102B and which are in fluid flow communication with a central passage 132 therethrough. A plurality of axial slots 132 are provided at each end of the male spacers 102A and 102B (only one slot 134 is shown in male spacer 102B in FIG. 4). Slots 134 enable the spacers 102A and 102B to flex adjacent to the slots 134 to thereby provide a snug fit when male spacers 102A and 102B are mated to their respective female spacers 100A to 100C. The central longitudinal passages 126 of the female spacers 100A to 100C are thereby in continuous communication with the central passages 132 of the male spacers 102A and 102B to provide for continuous and uninterrupted fluid flow through the network of male and female spacers. The U-shaped openings 128 in the female spacers and the U-shaped openings 130 in the male spacers thereby provide for fluid flow into and out of the central passages to communicate with the inner enclosure of the inner shell 14. Finally, the openings 106 and 108 in the spaces 102A to 102F provide for fluid flow from one side of the spacer to the other.

A second stand-off 136 is mounted on the inside of dome 14C of the inner shell 14, coaxially around the longitudinal axis of container 10. Stand-off 136 is provided with a pair of diametrically opposed openings 138 (only one shown) having a generally square shape that provide for fluid flow into and out of the enclosure of the stand-off. Stand-off 136 further supports one end of a coil spring 140 which biases between insulator 140F and second stand-off 136 in a similar manner as spring 120 biases between stand-off 52 and insulator 98A. Biasing springs 120 and 140 in conjunction with stand-offs 52 and 136 thus help to support the plurality of conductor bands 78A to 78E comprising the second conductor means in coaxial alignment with large cylindrical conductor 76 independent of the spatial orientation of container 10. Springs 120 and 140 also serve as dampers to absorb axial shock forces that may be imparted to container 10 and to maintain the conductors 76 and 78A to 78E in axial alignment with respect to each other and with respect to the side wall 14A during a disturbance caused by shock forces.

Thus, it is apparent from FIGS. 2 to 5, that the liquid quantity sensor of the present invention comprises separate and distinct conductor bands 78A to 78E locked in their parallel and coaxial alignment with respect to each other by the interconnecting network of spacers 100A to 100C and 102A and 102B, and associated insulators 98A to 98F and locked in their proximately spaced and parallel relationships with respect to conductor 106 by opposite facing annular channels 110 and 112 of two consecutive insulators supported by the interconnected male and female spacers. Conductor 76 is in turn held in position by the respective protrusions 114 extending radially outwardly at intermediate positions between the opposed outer steps of the spacers. This entire construction is then locked in the position shown in FIG. 2 by the bias applied to stand-offs 52 and 136 and associated insulators 98A and 98F by springs 54 and 140 to thereby provide a capacitor means that is useful for detecting the quantity of the cryogenic fluid 16 inside inner shell 14.

In Use

Dewar container 10 is intended for use by people needing to breath in a hostile environment where the atmosphere is not conducive to supporting life. In that respect, a user will first don the facepiece 24 (shown in block representation in FIG. 1) while the container 10 is carried on the back by a harness, as is well known to those of ordinary skill in the art. Inner shell 14 has previously been filled with cryogenic liquid 16. Valve 32 is then turned to an open position permitting flow through the system. The cryogenic liquid 16 flows from the inner shell 14 via conduits 26 and 34 to the first endothermic heat exchanger 62 which adds heat energy to the cryogenic liquid 16 to provide for initial vaporizing and then warming of the liquid 16. The raised-energy fluid leaving the first endothermic heat exchanger 66 is then in a gaseous state near ambient temperature, the actual gas temperature dependent on the flow rate through the heat exchanger 62. This gas then moves through the internal exothermic heat exchanger 66 mounted inside the inner shell 14 where thermal energy input into the raised-energy fluid is conducted to the cryogenic liquid 16 still inside the inner shell 14. This adds heat energy to the cryogenic liquid 16 and causes some of the cryogenic liquid to boil and thereby maintain a pressure head inside the inner shell 14 while simultaneously causing the temperature of the gas flowing through the exothermic heat exchanger 66 to cool. The cooled gas in the exothermic heat exchanger 66 is then moved to the second endothermic heat exchanger 70 where heat energy is again conducted from the ambient surroundings to warm the gas to about ambient temperature before the gas is delivered to the facepiece 22 as a breathable air mixture.

Preferably, heat exchanger 66 is disposed inside the inner shell 14 such that some portion of heat exchanger 66 is at least partially immersed in the cryogenic liquid 16 independent of the spatial orientation of the container 10 to provide a breathing apparatus that is operable in any spatial orientation. For a more detailed description of the spatial independent vaporization function of Dewar container 10, reference is made to U.S. Pat. No. 5,357,758 to Andonian, the disclosure of which is incorporated herein by reference.

The liquid quantity sensor of the present invention is provided inside the inner shell 14 to continuously monitor the liquid quantity of cryogenic liquid 16 remaining inside the Dewar container 10. This is derived by using a mathematical model of the geometry of the sensor configuration as previously described, i.e., the configuration of conductor 76 and conductor bands 78A to 78E in relation to the shape and volume of inner shell 14. From the capacitance measurements $C_1$ to $C_5$ of each "zone" of conductor 76 covered by bands 78A to 78E, the fractional coverage of each zone can be predicted for any quantity of liquid 16 and at any orientation angle of Dewar container 10. The computer 86 does this by scaling the raw capacitance measurement $C_1$ to $C_5$ for each zone to create an uncovered value as zero and a fully covered value as one. Computer 86 takes this data, computes an average percentage fill of Dewar container 10 and then selects the nearest percent from a fill table stored in a database input in the computer memory for a wide range of fill quantities and inclination angles to thereby produce a best fit for one fill value at a specific angle of inclination. This process is periodically repeated to thereby determine a change in liquid quantity from a first measurement event to a second measurement event and to determine a change in inclination of the Dewar container 10 with respect to the two measurement events.

As further shown in the block diagram in FIG. 6, the micro-processor 86 sends the calculated cryogenic fluid level reading to a monitor (not shown) that is provided with a display such as, for example, the bar graph 142 for visually outputting the quantity of cryogenic liquid 16 remaining in Dewar container 10. It should be understood that the output of display 142 can be in many forms such as LED's or numeric read-out, and that the bar graph shown is only representative. The Dewar container 10 monitor is also provided with an alarm 144 that emits a detectable signal such as a pneumatic tactical or an audible form, at such time as the supply of cryogenic liquid 16 has been depleted to about 25 percent of total capacity. Electrical power is provided to the sensor means by a battery 146 connected to a battery test circuit, indicated as block 148, tied in with computer 86 which regulates the distribution of power to the sensor means via a power transmission cable 150 tied to multiplexer 88, A/D converter 90 and in turn micro-processor 86. A battery low power alarm 152 is provided to signal when the energy left in battery 146 is depleted to a predetermined level. The predetermined level would be established to ensure a residual battery energy capacity to allow sufficient time for egress of the respirator user from a hazardous environment. The trigger level therefore would be set at a battery energy capacity equivalent to one or more hours of continuous operation in alarm mode).

In accordance with the present invention, the measured capacitances $C_1$ to $C_5$ for the five capacitors (conductor bands 78A to 78E) are compared to a set of reference capacitance values stored in a database of micro-processor 86 or other suitable computer for the container 10 at various volume percentages (percent fills) and spatial orientations to select a volume percentage as well as a spatial orientation which is a "best fit" to the set of measured capacitances $C_1$ to $C_5$. As seen in FIG. 2, the capacitors 78A to 78E divide the length of the container 10 into zones, there being five generally equal zones for the five capacitors. Although capacitors are provided to determine a percentage of contact of the liquid with each zone in accordance with a preferred embodiment of the present invention, it should be understood that the percentage of contact of the liquid with each zone may be determined in other ways or by other means which are meant to come within the scope of the present invention. By "best fit" is meant a volume percentage and/or spatial orientation which has a set of reference capacitance values or reference percentage of contact values which, of all of the sets of reference values in the database, approximate most closely the set of measured capacitances or measured percentages of contact. A closer "best fit" may be obtained by computing a weighted average and/or interpolation as discussed hereinafter. It should also be understood that, with the dimensions of the container known, the percentage volume and spatial orientation may be determined by ways other than comparing with the reference sets of values. For example, if a large number of point capacitors are provided to blanket the inside wall of a container, the percentage volume and spatial orientation may be calculated based on information as to which point zones are contacted by the liquid.

Each volume percentage and spatial orientation has a set of values of percentage of contact of the liquid with each zone (scaled capacitance value for each capacitor) wherein a fully covered zone has a value of "one" and an uncovered zone has a value of "zero". Each percentage of contact value after normalization is a fractional number, i.e., between zero and one. These reference values can be determined mathematically if the geometry of the container is known or by observing the percentages of contact when the container 10 or similar container having the same dimensions is subjected to each combination of volume percentage and spatial orientation. These reference values can be obtained for providing in the database utilizing principles commonly known to those of ordinary skill in the art to which this invention pertains.

An example of the mathematical equations used to compute cylinder volume and contact surface areas of capacitance elements at various angles and fill volumes is appended to this specification. As indicated the exemplary analysis is for a cylinder of certain specified dimensions, having 5 capacitor segments, and being 25 percent filled and having an inclination of 30 degrees. In table 2, the total cylinder surface area and volume and filled cylinder volume are calculated. Continuing on, Tables 3 through 6 thereof deal with determining which of four conditions of coverage exists for each zone of the capacitive sensor elements. The four cases are:

TABLE 1

| Analysis of Cylinder Volume | |
|---|---|
| $r := 5.7$ | Outer cylinder radius in cm. |
| $ri := 4.37$ | Inner cylinder radius in cm. |
| $hi := 37.3$ | Inner cylinder length in cm. |
| $h := hi \cdot (1.168)$ | Outer cylinder length in cm |
| $P_{an} := 0.25$ | Input: Specify percent filled |
| $K := 5$ | Specify number of capacitor sements |
| $tol := 1 \cdot 10^{-3}$ | Tolerance on equality tests |
| $\theta := \dfrac{[1 \cdot \pi]}{6}$ | Input: Angle - 0 equals horizontal |

TABLE 2

| Total Cylinder Surface Area: | $A_{cyl} := 2 \cdot \pi \cdot r \cdot h$ | $A_{cap} := 2 \cdot \pi \cdot ri \cdot hi$ |
|---|---|---|
| | $A_{cyl} = 1560.294$ | $A_{cap} = 1024.165$ |
| Total Cylinder Volume: | $V_{cyl} := \pi \cdot r^2 \cdot h$ | |
| | $V_{cyl} = 4446.837$ | |
| Filled Cylinder Volume: | $V_{fill} := P_{an} \cdot V_{cyl}$ | |
| $\theta 1 := \theta \cdot \left[ \dfrac{180}{\pi} \right]$ | $V_{fill} = 1111.709$ | |

TABLE 3

1. Calculate Boundaries of 4 Regimes and Area versus x Matrix a) One End Partially Submerged; Other End Not Submerged $xst := -r \cdot \cos(\theta)$
$xend := \text{if}[r \cdot \cos(\theta) < h \cdot \sin(\theta) - r \cdot \cos(\theta) ,$
$r \cdot \cos(\theta), h \cdot \sin(\theta) - r \cdot \cos(\theta)]$
$ipossa := \text{if}(xst - xendl < tol,0.0,1.0)$
Note limit for opposite submerging before first end fully submerged
$\theta 1 = 30$     $xst = -4.936$     $xend = 4.936$
$xa := -\infty$
$y := 1$
Given

TABLE 3-continued

1. Calculate Boundaries of 4 Regimes and Area versus x Matrix

$\phi[y,\alpha] := \mathrm{acos}\left[\dfrac{y}{r\cdot\cos(\alpha)}\right]$ $V_{full} = \left[r^2 \cdot \dfrac{y}{\sin(\alpha)} \cdot [\pi - \phi[y,\alpha]] + \left[2 \cdot \dfrac{r^3}{3} \cdot \dfrac{\cos(\alpha)}{\sin(\alpha)} \cdot \sin[\phi[y,\alpha]]\right] + \dfrac{(y^3)}{3 \cdot \sin(\alpha)\cdot\cos(\alpha)^2} \cdot \tan[\phi[y,\alpha]]\right]$ depth($\alpha$) := find(y)
xa := depth($\theta$)
xa = $-1 \cdot 10^{307}$

[did not find solution]

ipossa := if(xa < xst,0,1)
ipossa := if(xa > xend,0,ipossa)
ipossa = 0

TABLE 4 b) One End Fully Submerged; Other End Not Submerged xst := if[r · cos($\theta$) < h · sin($\theta$) − r · cos($\theta$), r · cos($\theta$), 0.0]
xend := if[r · cos($\theta$) < h · sin($\theta$) − r · cos($\theta$),
h · sin($\theta$) − r · cos($\theta$), 0]
ipossb := if(|xst − xend| < tol,0.0,1.0)
$\theta 1 = 30$      xst = 4.936      xend = 16.847
xb := $-\infty$ $xb := \dfrac{V_{full} \cdot \sin(\theta)}{[\pi \cdot r^2]}$ xb = 5.446
ipossb := if(xb < xst,0,1)
ipossb := if(xb > xend,0,ipossb)
ipossb = 1

TABLE 5 c) One End Fully Submerged; Other End Partially Submerged xst := if[h · sin($\theta$) − r · cos($\theta$) > r · cos($\theta$),
h · sin($\theta$) − r · cos($\theta$), r · cos($\theta$)]
xend := [h · sin($\theta$) + r · cos($\theta$)]
ipossc := if(|xst − xend| < tol,0.0,1.0)
$\theta 1 = 30$      xst = 16.847      xend = 26.72
x2 := 1      xc := $-\infty$
x2 := 1
Given $\phi(x2) := \mathrm{acos}\left[\dfrac{x2}{r\cdot\cos(\theta)}\right]$ $V_{full} = V_{cyl} - r^2 \cdot \dfrac{x2}{\sin(\theta)} \cdot [\pi - \phi(x2)] - 2 \cdot \dfrac{r^3}{3} \cdot \dfrac{\cos(\theta)}{\sin(\theta)} \cdot \sin[\phi(x2)] - \dfrac{(x2)^3}{3 \cdot \sin(\theta) \cdot \cos(\theta)^2} \cdot \tan[\phi(x2)]$ xsol := find(x2)

[did not find solution]

xc := −xsol + h · sin($\theta$)
xc = $-1 \cdot 10^{307}$
ipossc := if(xc < xst,0,1)

TABLE 5-continued c) One End Fully Submerged; Other End Partially Submerged ipossc := if(xc > xend,0,ipossc)
ipossc = 0

TABLE 6 d) Both Ends Partially Submerged xst := if[h · sin($\theta$) − r · cos($\theta$) > r · cos($\theta$),0.0,
h · sin($\theta$) − r · cos($\theta$)]
xtemp := if[h · sin($\theta$) + r · cos($\theta$) < r · cos($\theta$),
h · sin($\theta$) + r · cos($\theta$), r · cos($\theta$)]
xend := if[h · sin($\theta$) − r · cos($\theta$) > r · cos($\theta$),0.0,xtemp]
ipossd := if(|xst − xend| < tol,0.0,1.0)
$\theta 1 = 30$      xst = 0      xend = 0
x := 0
xd := $-\infty$ $u1(x) := \dfrac{x}{r\cdot\cos(\theta)}$ $u2(x) := \dfrac{x}{r\cdot\cos(\theta)} - h \cdot \dfrac{\tan(\theta)}{r}$ $a1(x) := r^2 \cdot \dfrac{h}{u2(x)-u1(x)} \cdot \left[[u1(x)\cdot\mathrm{acos}(u1(x)) - \sqrt{1-(u1(x))^2}] - \left[\dfrac{-1}{3} \cdot \sqrt{[1-(u1(x))^2]^3}\right]\right]$ $a2(x) := r^2 \cdot \dfrac{h}{u2(x)-u1(x)} \cdot \left[[u2(x)\cdot\mathrm{acos}(u2(x)) - \sqrt{1-(u1(x))^2}] - \left[\dfrac{-1}{3} \cdot \sqrt{[1-(u2(x))^2]^3}\right]\right]$ Given
$V_{fill} = [\pi \cdot r^2 \cdot h - (a2(x) - a1(x))]$
xd := find(x)

[did not find solution]

xd = $-1 - 10^{307}$
ipossd := if(xd < xst,0,1)
ipossd := if(xd > xend,0,ipossd)
ipossd = 0

TABLE 7

Setup for Surface Area Calculation

1. Select Valid X value iposs := ipossa + ipossb + ipossc + ipossd      ipossa = 0      ipossb = 1
iposs = 1                                        ipossc = 0      ipossd = 0
xa = $-1 \cdot 10^{307}$   xb = 5.446   xc = $1 \cdot 10^{307}$   xd = $-1 \cdot 10^{307}$
x := if[ipossa = 1,xa,$-\infty$]
x := if(ipossb = 1,xb,x)
x := if(ipossc = 1,xc,x)
x := if(ipossd = 1,xd,x)
x = 5.446

2. Set parameters for inner cylindrical capacitor or segment area rx := ri                                hx := $\dfrac{hi}{K}$ h = 43.566          hi = 37.3          hx = 7.46
$A_x := 2 \cdot \pi \cdot rx \cdot hx$                        $A_x = 204.833$

TABLE 8

Area calculations

1. Calculate Boundaries of 4 Regimes and Area versus x Matrix a) One End Partially Submerged; Other End Not Submerged $xsta := -rx \cdot \cos(\theta)$
$xenda := if[rx \cdot \cos(\theta) < hx \cdot \sin(\theta) - rx \cdot \cos(\theta),$
$rx \cdot \cos(\theta), hx \cdot \sin(\theta) - rx \cdot \cos(\theta)]$
$\theta1 = 30 \qquad xsta = -3.785 \qquad xenda = -0.055$
$ipossa(d) := if(d < xsta, 0, 1)$
$ipossa(d) := if(d > xenda, 0, ipossa(d))$ $$\alpha(d) := \left[ \frac{d}{rx \cdot \cos(\theta)} \right]$$

$\phi(d) := acos[\alpha(d)]$ $$Aa(d) := \frac{2 \cdot rx \cdot d \cdot [\pi - \phi(d)]}{\sin(\theta)} + 2 \cdot rx^2 \cdot \frac{\cos(\theta)}{\sin(\theta)} \cdot \sin[\phi(d)]$$

$Aa(d) := if(ipossa(d) = 0, 0, Aa(d))$

TABLE 9 b) One End Fully Submerged; Other End Not Submerged $xstb := if[rx \cdot \cos(\theta) < hx \cdot \sin(\theta) - rx \cdot \cos(\theta), rx \cdot \cos(\theta), 0.0]$
$xendb := if[rx \cdot \cos(\theta) < hx \cdot \sin(\theta) - rx \cdot \cos(\theta),$
$hx \cdot \sin(\theta) - rx \cdot \cos(\theta), 0]$
$\theta1 = 30 \qquad xstb = 0 \qquad xendb = 0$
$ipossb(d) := if(d < xstb, 0, 1)$
$ipossb(d) := if(d > xendb, 0, ipossb(d))$ $$Ab(d) := 2 \cdot \pi \cdot d \cdot \frac{rx}{\sin(\theta)}$$

$Ab(d) := if(ipossb(d) = 0, 0, Ab(d))$

TABLE 10 c) One End Fully Submerged; Other End Partially Submerged $xstc := if[hx \cdot \sin(\theta) - rx \cdot \cos(\theta) > rx \cdot \cos(\theta),$
$hx \cdot \sin(\theta) - rx \cdot \cos(\theta), rx \cdot \cos(\theta)]$
$xendc := [hx \cdot \sin(\theta) + rx \cdot \cos(\theta)]$
$\theta1 = 30 \qquad xstc = 3.785 \qquad xendc = 7.515$
$ipossc(d) := if(d < xstc, 0, 1)$
$ipossc(d) := if(d > xendc, 0, ipossc(d))$
$x2(d) := -d + hx \cdot \sin(\theta)$ $$\phi(d) := acos\left[ \frac{x2(d)}{rx \cdot \cos(\theta)} \right]$$

$$Ac(d) := A_x - \frac{2 \cdot rx \cdot x2(d) \cdot [\pi - \phi(d)]}{\sin(\theta)} - 2 \cdot rx^2 \cdot \frac{\cos(\theta)}{\sin(\theta)} \cdot \sin[\phi(d)]$$

$Ac(d) := if(ipossc(d) = 0, 0, Ac(d))$

TABLE 11 d) Both Ends Partially Submerged $xstd := if[hx \cdot \sin(\theta) - rx \cdot \cos(\theta) > rx \cdot \cos(\theta), 0.0,$
$hx \cdot \sin(\theta) - rx \cdot \cos(\theta)]$
$xtemp := if[hx \cdot \sin(\theta) + rx \cdot \cos(\theta) < rx \cdot \cos(\theta),$
$hx \cdot \sin(\theta) + rx \cdot \cos(\theta), rx \cdot \cos(\theta)]$
$xendd := if[hx \cdot \sin(\theta) - rx \cdot \cos(\theta) > rx \cdot \cos(\theta), 0.0, xtemp]$
$\theta1 = 30 \qquad xstd = -0.055 \qquad xendd = 3.785$
$ipossd(d) := if(d < xstd, 0, 1)$
$ipossd(d) := if(d > xendd, 0, ipossd(d))$

TABLE 11-continued d) Both Ends Partially Submerged $$u1(d) := \left[ \frac{-d}{[rx \cdot \cos(\theta)]} \right] \qquad u2(d) := \left[ \frac{[-d + hx \cdot \sin(\theta)]}{[rx \cdot \cos(\theta)]} \right]$$

$$a1(d) := \frac{2 \cdot (rx)^2}{[-\tan(\theta)]} \cdot [u1(d) \cdot acos(u1(d)) - \sqrt{1 - (u1(d))^2}]$$

$$a2(d) := \frac{2 \cdot (rx)^2}{[-\tan(\theta)]} \cdot [u2(d) \cdot acos(u2(d)) - \sqrt{1 - (u2(d))^2}]$$

$Ad(d) := (-a2(d) + a1(d))$
$Ad(d) := if(ipossd(d) = 0, 0, Ad(d))$

TABLE 12 e. Cylinder Submerged
$iposse(d) := if(d > xendc, 1, 0)$
$Ae(d) := 2 \cdot \pi \cdot rx \cdot hx$
$Ae(d) := if(iposse(d) = 0, 0, Ae(d))$
$Ae(x) = 0$

TABLE 13

Create area computation function $A(d) := if(ipossa(d) = 1, Aa(d), 0)$
$A(d) := if(ipossb(d) = 1, Ab(d), A(d))$
$A(d) := if(ipossc(d) = 1, Ac(d), A(d))$
$A(d) := if(ipossd(d) = 1, Ad(d), A(d))$
$A(d) := if(iposse(d) = 1, Ae(d), A(d))$
$A(x) = 178.868$ Define and Compute Cylinder Areas $1 := 0 \ldots (K-1) \qquad n := 1 \ldots K - 1$ $$y_0 := x - \frac{(h - hi)}{2} \cdot \sin(\theta)$$

$y_n := y_{[n-1]} - hx \cdot \sin(\theta)$
$area_1 := A[y_1] \qquad A_{tot} := \sum_1 area1$ $$anorm_1 := \frac{area_1}{A_x} \qquad Anorm_1 := \frac{A_{tot}}{A_{cap}}$$

TABLE 14

Area Distribution Across Segments

| Area (cm^2) | Normalized Area |
|---|---|
| $area = \begin{bmatrix} 142.72 \\ 69.52 \\ 0.78 \\ 0 \\ 0 \end{bmatrix}$ | $anorm = \begin{bmatrix} 0.697 \\ 0.339 \\ 0.004 \\ 0 \\ 0 \end{bmatrix}$ |

$A_{tot} = 213.026 \qquad A_{norm} = 0.208$

Input Values (Percent filled Angle):

$P_{fill} = 0.25 \qquad \theta \cdot \frac{180}{\pi} = 30$

Surface Areas (Outer Cylinder, Capacitor, Sector):

$A_{cyl} = 1560.294 \qquad A_{cap} = 1024.165 \qquad A_x = 204.833$ a. One end partially submerged, other end not submerged
b. One end fully submerged, other end not submerged c. One end fully submerged, other end partially submerged d. Both ends partially submerged When the appropriate condition of each zone is determined, a surface area covered calculation is performed for each zone as provided in tables 7 through 12. These calculations take into account the percent fill and orientation of the zonal sensor array. Table 13 results and relates the calculations to actual area covered in each zone, and a Table 14 provides a summary of normalized area coverage for each capacitive zone in an array format. These are the reference values which are loaded into the following 12 reference Tables 15 to 26, and these calculations are repeated for each percent fill for each angle of orientation.

Figure 7:
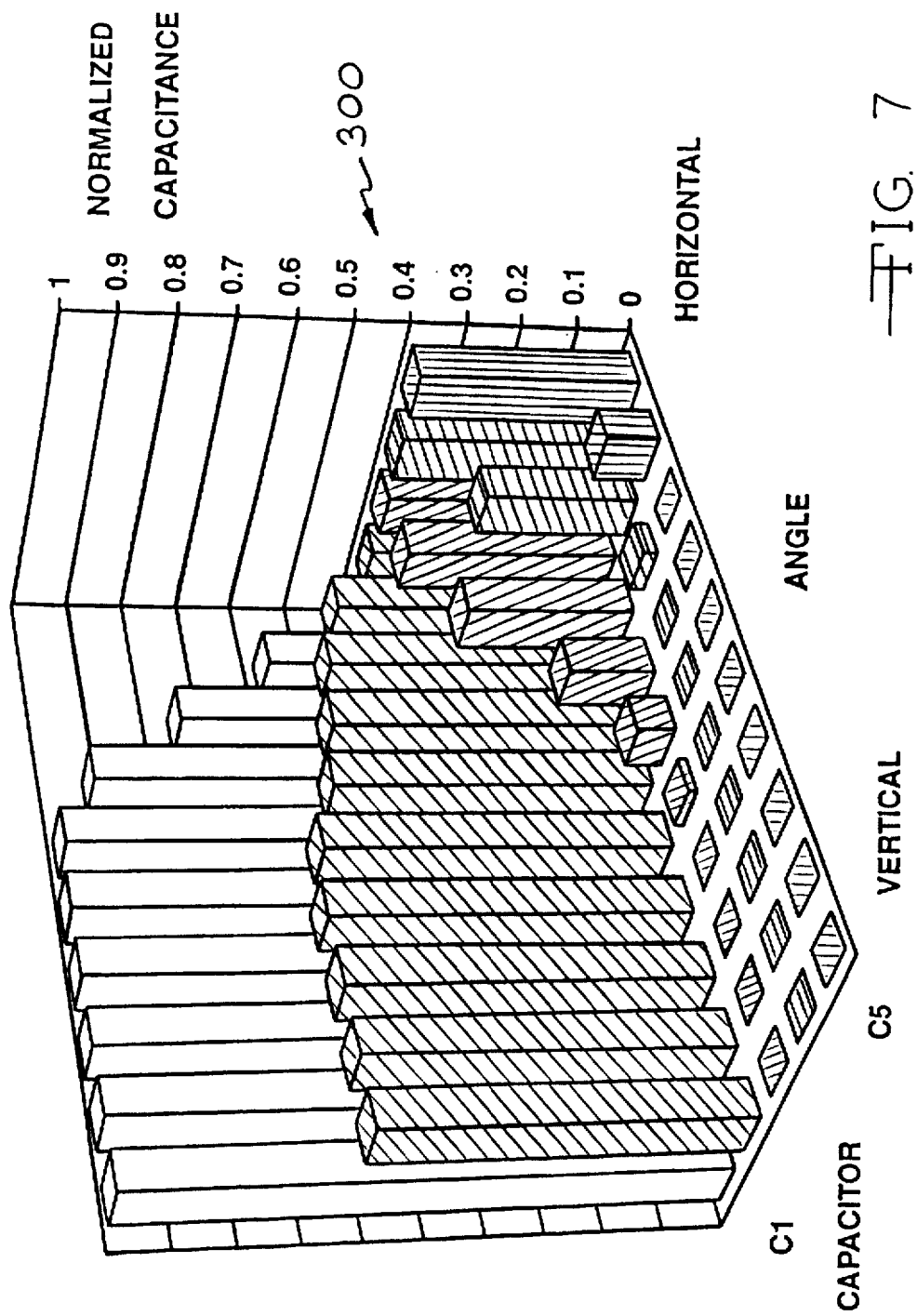
FIG. 7 is a graph showing the variation in coverage for each of five conductive bands as a container orientation changes from vertical to horizontal at a 35 percent fill level.

Table 15 to 26 constitute an example of a series of sets of the reference capacitance values (scaled between zero and one) for each 10 degrees of container orientation (theta), 0 degrees being horizontal and 90 degrees being vertical, for percent fills of 10, 20, 25, 27.5, 30, 35, 40, 50, 60, 70, 80, and 90 percent. The five capacitors are labeled C1, C2, C3, C4, and C5. The "Average" column contains the average of the five reference capacitance values at each theta and percent fill and is usable as discussed hereinafter. The values in the 25 percent fill Table 19 for 30 degree inclination are the values derived in the example contained in Tables 1 through 14. FIG. 7 shows at 300 a graphical representation of the data in the 35 percent fill table, showing the variation in coverage for each zonal capacitor as the container orientation changes from vertical to horizontal.

TABLE 15

| Theta | % Fill | C1 | C2 | C3 | C4 | C5 | Average | Sq. Error |
|---|---|---|---|---|---|---|---|---|
| 0 | 10 | 0.146 | 0.146 | 0.146 | 0.146 | 0.146 | 0.15 | 1.21 |
| 10 | | 0.331 | 0.197 | 0.009 | 0 | 0 | 0.11 | 1.68 |
| 20 | | 0.362 | 0.072 | 0 | 0 | 0 | 0.09 | 1.66 |
| 30 | | 0.352 | 0.008 | 0 | 0 | 0 | 0.07 | 1.56 |
| 40 | | 0.3 | 0 | 0 | 0 | 0 | 0.06 | 1.45 |
| 50 | | 0.247 | 0 | 0 | 0 | 0 | 0.05 | 1.36 |
| 60 | | 0.203 | 0 | 0 | 0 | 0 | 0.04 | 1.29 |
| 70 | | 0.171 | 0 | 0 | 0 | 0 | 0.03 | 1.24 |
| 80 | | 0.164 | 0 | 0 | 0 | 0 | 0.03 | 1.23 |
| 90 | | 0.164 | 0 | 0 | 0 | 0 | 0.03 | 1.23 |

TABLE 16

| Theta | % Fill | C1 | C2 | C3 | C4 | C5 | Average | Sq. Error |
|---|---|---|---|---|---|---|---|---|
| 0 | 20 | 0.278 | 0.278 | 0.278 | 0.278 | 0.278 | 0.28 | 1.25 |
| 10 | | 0.456 | 0.355 | 0.232 | 0.037 | 0 | 0.22 | 1.92 |
| 20 | | 0.535 | 0.323 | 0.036 | 0 | 0 | 0.18 | 2.58 |
| 30 | | 0.582 | 0.206 | 0 | 0 | 0 | 0.16 | 2.81 |
| 40 | | 0.637 | 0.111 | 0 | 0 | 0 | 0.15 | 2.86 |
| 50 | | 0.696 | 0.052 | 0 | 0 | 0 | 0.15 | 2.89 |
| 60 | | 0.735 | 0.013 | 0 | 0 | 0 | 0.15 | 2.81 |
| 70 | | 0.748 | 0 | 0 | 0 | 0 | 0.15 | 2.78 |
| 80 | | 0.748 | 0 | 0 | 0 | 0 | 0.15 | 2.78 |
| 90 | | 0.748 | 0 | 0 | 0 | 0 | 0.15 | 2.78 |

TABLE 17

| Theta | % Fill | C1 | C2 | C3 | C4 | C5 | Average | Sq. Error |
|---|---|---|---|---|---|---|---|---|
| 0 | 25 | 0.323 | 0.323 | 0.323 | 0.323 | 0.323 | 0.32 | 1.23 |
| 10 | | 0.503 | 0.405 | 0.296 | 0.131 | 0 | 0.27 | 1.86 |
| 20 | | 0.605 | 0.4 | 0.118 | 0 | 0 | 0.22 | 2.84 |
| 30 | | 0.697 | 0.339 | 0.004 | 0 | 0 | 0.21 | 4.24 |
| 40 | | 0.797 | 0.243 | 0 | 0 | 0 | 0.21 | 6.15 |
| 50 | | 0.863 | 0.177 | 0 | 0 | 0 | 0.21 | 5.88 |

TABLE 17-continued

| Theta | % Fill | C1 | C2 | C3 | C4 | C5 | Average | Sq. Error |
|---|---|---|---|---|---|---|---|---|
| 60 | | 0.912 | 0.128 | 0 | 0 | 0 | 0.21 | 4.88 |
| 70 | | 0.951 | 0.089 | 0 | 0 | 0 | 0.21 | 4.10 |
| 80 | | 0.985 | 0.055 | 0 | 0 | 0 | 0.21 | 3.55 |
| 90 | | 1 | 0.04 | 0 | 0 | 0 | 0.21 | 3.34 |

TABLE 18

| Theta | % Fill | C1 | C2 | C3 | C4 | C5 | Average | Sq. Error |
|---|---|---|---|---|---|---|---|---|
| 0 | 27.5 | 0.344 | 0.344 | 0.344 | 0.344 | 0.344 | 0.34 | 1.21 |
| 10 | | 0.524 | 0.427 | 0.323 | 0.183 | 0.003 | 0.29 | 1.80 |
| 20 | | 0.64 | 0.433 | 0.168 | 0 | 0 | 0.25 | 2.82 |
| 30 | | 0.765 | 0.394 | 0.027 | 0 | 0 | 0.24 | 5.08 |
| 40 | | 0.863 | 0.323 | 0 | 0 | 0 | 0.24 | 9.02 |
| 50 | | 0.925 | 0.261 | 0 | 0 | 0 | 0.24 | 8.98 |
| 60 | | 0.969 | 0.217 | 0 | 0 | 0 | 0.24 | 6.77 |
| 70 | | 0.997 | 0.189 | 0 | 0 | 0 | 0.24 | 5.60 |
| 80 | | 1 | 0.186 | 0 | 0 | 0 | 0.24 | 5.50 |
| 90 | | 1 | 0.186 | 0 | 0 | 0 | 0.24 | 5.50 |

TABLE 19

| Theta | % Fill | C1 | C2 | C3 | C4 | C5 | Average | Sq. Error |
|---|---|---|---|---|---|---|---|---|
| 0 | 30 | 0.363 | 0.363 | 0.363 | 0.363 | 0.363 | 0.36 | 1.19 |
| 10 | | 0.545 | 0.448 | 0.346 | 0.22 | 0.025 | 0.32 | 1.74 |
| 20 | | 0.676 | 0.465 | 0.221 | 0 | 0 | 0.27 | 2.70 |
| 30 | | 0.826 | 0.445 | 0.062 | 0 | 0 | 0.27 | 5.02 |
| 40 | | 0.918 | 0.412 | 0.002 | 0 | 0 | 0.27 | 6.88 |
| 50 | | 0.972 | 0.36 | 0 | 0 | 0 | 0.27 | 7.69 |
| 60 | | 1 | 0.332 | 0 | 0 | 0 | 0.27 | 7.24 |
| 70 | | 1 | 0.332 | 0 | 0 | 0 | 0.27 | 7.24 |
| 80 | | 1 | 0.332 | 0 | 0 | 0 | 0.27 | 7.24 |
| 90 | | 1 | 0.332 | 0 | 0 | 0 | 0.27 | 7.24 |

TABLE 20

| Theta | % Fill | C1 | C2 | C3 | C4 | C5 | Average | Sq. Error |
|---|---|---|---|---|---|---|---|---|
| 0 | 35 | 0.4 | 0.4 | 0.4 | 0.4 | 0.4 | 0.40 | 1.15 |
| 10 | | 0.585 | 0.487 | 0.389 | 0.276 | 0.095 | 0.37 | 1.62 |
| 20 | | 0.761 | 0.525 | 0.311 | 0.027 | 0 | 0.32 | 2.38 |
| 30 | | 0.926 | 0.541 | 0.157 | 0 | 0 | 0.32 | 3.34 |
| 40 | | 0.993 | 0.564 | 0.667 | 0 | 0 | 0.32 | 3.38 |
| 50 | | 1 | 0.607 | 0.017 | 0 | 0 | 0.32 | 3.03 |
| 60 | | 1 | 0.624 | 0 | 0 | 0 | 0.32 | 2.90 |
| 70 | | 1 | 0.624 | 0 | 0 | 0 | 0.32 | 2.90 |
| 80 | | 1 | 0.624 | 0 | 0 | 0 | 0.32 | 2.90 |
| 90 | | 1 | 0.624 | 0 | 0 | 0 | 0.32 | 2.90 |

TABLE 21

| Theta | % Fill | C1 | C2 | C3 | C4 | C5 | Average | Sq. Error |
|---|---|---|---|---|---|---|---|---|
| 0 | 40 | 0.434 | 0.434 | 0.434 | 0.434 | 0.434 | 0.43 | 1.11 |
| 10 | | 0.624 | 0.524 | 0.428 | 0.323 | 0.183 | 0.42 | 1.48 |
| 20 | | 0.86 | 0.585 | 0.379 | 0.092 | 0 | 0.38 | 2.03 |
| 30 | | 0.991 | 0.643 | 0.282 | 0 | 0 | 0.38 | 2.19 |
| 40 | | 1 | 0.734 | 0.182 | 0 | 0 | 0.38 | 2.07 |
| 50 | | 1 | 0.799 | 0.117 | 0 | 0 | 0.38 | 1.91 |
| 60 | | 1 | 0.847 | 0.069 | 0 | 0 | 0.38 | 1.78 |
| 70 | | 1 | 0.885 | 0.031 | 0 | 0 | 0.38 | 1.68 |
| 80 | | 1 | 0.913 | 0.003 | 0 | 0 | 0.38 | 1.61 |
| 90 | | 1 | 0.916 | 0 | 0 | 0 | 0.38 | 1.60 |

TABLE 22

| Theta | % Fill | C1 | C2 | C3 | C4 | C5 | Average | Sq. Error |
|---|---|---|---|---|---|---|---|---|
| 0 | 50 | 0.5 | 0.5 | 0.5 | 0.5 | 0.5 | 0.50 | 1.02 |
| 10 | | 0.707 | 0.598 | 0.5 | 0.402 | 0.293 | 0.50 | 1.26 |
| 20 | | 0.991 | 0.721 | 0.5 | 0.279 | 0.009 | 0.50 | 1.39 |
| 30 | | 1 | 0.887 | 0.5 | 0.113 | 0 | 0.50 | 1.27 |
| 40 | | 1 | 0.968 | 0.5 | 0.032 | 0 | 0.50 | 1.19 |
| 50 | | 1 | 1 | 0.5 | 0 | 0 | 0.50 | 1.16 |
| 60 | | 1 | 1 | 0.5 | 0 | 0 | 0.50 | 1.16 |
| 70 | | 1 | 1 | 0.5 | 0 | 0 | 0.50 | 1.16 |
| 80 | | 1 | 1 | 0.5 | 0 | 0 | 0.50 | 1.16 |
| 90 | | 1 | 1 | 0.5 | 0 | 0 | 0.50 | 1.16 |

TABLE 23

| Theta | % Fill | C1 | C2 | C3 | C4 | C5 | Average | Sq. Error |
|---|---|---|---|---|---|---|---|---|
| 0 | 60 | 0.566 | 0.566 | 0.566 | 0.566 | 0.566 | 0.57 | 0.93 |
| 10 | | 0.817 | 0.677 | 0.572 | 0.476 | 0.376 | 0.58 | 1.08 |
| 20 | | 1 | 0.908 | 0.621 | 0.415 | 0.14 | 0.62 | 1.02 |
| 30 | | 1 | 1 | 0.718 | 0.357 | 0.009 | 0.62 | 0.94 |
| 40 | | 1 | 1 | 0.818 | 0.266 | 0 | 0.62 | 0.90 |
| 50 | | 1 | 1 | 0.883 | 0.201 | 0 | 0.62 | 0.87 |
| 60 | | 1 | 1 | 0.931 | 0.153 | 0 | 0.62 | 0.85 |
| 70 | | 1 | 1 | 0.969 | 0.115 | 0 | 0.62 | 0.83 |
| 80 | | 1 | 1 | 0.997 | 0.087 | 0 | 0.62 | 0.82 |
| 90 | | 1 | 1 | 1 | 0.084 | 0 | 0.62 | 0.81 |

TABLE 24

| Theta | % Fill | C1 | C2 | C3 | C4 | C5 | Average | Sq. Error |
|---|---|---|---|---|---|---|---|---|
| 0 | 70 | 0.637 | 0.637 | 0.637 | 0.637 | 0.637 | 0.64 | 0.84 |
| 10 | | 0.975 | 0.78 | 0.654 | 0.552 | 0.455 | 0.68 | 0.92 |
| 20 | | 1 | 1 | 0.779 | 0.535 | 0.320 | 0.73 | 0.82 |
| 30 | | 1 | 1 | 0.938 | 0.555 | 0.174 | 0.73 | 0.76 |
| 40 | | 1 | 1 | 0.998 | 0.588 | 0.082 | 0.73 | 0.74 |
| 50 | | 1 | 1 | 1 | 0.64 | 0.028 | 0.73 | 0.72 |
| 60 | | 1 | 1 | 1 | 0.668 | 0 | 0.73 | 0.72 |
| 70 | | 1 | 1 | 1 | 0.668 | 0 | 0.73 | 0.72 |
| 80 | | 1 | 1 | 1 | 0.688 | 0 | 0.73 | 0.72 |
| 90 | | 1 | 1 | 1 | 0.688 | 0 | 0.73 | 0.72 |

TABLE 25

| Theta | % Fill | C1 | C2 | C3 | C4 | C5 | Average | Sq. Error |
|---|---|---|---|---|---|---|---|---|
| 0 | 80 | 0.722 | 0.722 | 0.722 | 0.722 | 0.722 | 0.72 | 0.75 |
| 10 | | 1 | 0.963 | 0.768 | 0.645 | 0.544 | 0.78 | 0.76 |
| 20 | | 1 | 1 | 0.964 | 0.677 | 0.465 | 0.82 | 0.69 |
| 30 | | 1 | 1 | 1 | 0.794 | 0.418 | 0.84 | 0.66 |
| 40 | | 1 | 1 | 1 | 0.889 | 0.363 | 0.85 | 0.64 |
| 50 | | 1 | 1 | 1 | 0.948 | 0.304 | 0.85 | 0.63 |
| 60 | | 1 | 1 | 1 | 0.987 | 0.265 | 0.85 | 0.63 |
| 70 | | 1 | 1 | 1 | 1 | 0.252 | 0.85 | 0.62 |
| 80 | | 1 | 1 | 1 | 1 | 0.252 | 0.85 | 0.62 |
| 90 | | 1 | 1 | 1 | 1 | 0.252 | 0.85 | 0.62 |

TABLE 26

| Theta | % Fill | C1 | C2 | C3 | C4 | C5 | Average | Sq. Error |
|---|---|---|---|---|---|---|---|---|
| 0 | 90 | 0.854 | 0.854 | 0.854 | 0.854 | 0.854 | 0.85 | 0.63 |
| 10 | | 1 | 1 | 0.991 | 0.803 | 0.669 | 0.89 | 0.62 |
| 20 | | 1 | 1 | 1 | 0.928 | 0.638 | 0.91 | 0.60 |
| 30 | | 1 | 1 | 1 | 0.992 | 0.648 | 0.93 | 0.59 |
| 40 | | 1 | 1 | 4 | 1 | 0.7 | 0.94 | 0.58 |
| 50 | | 1 | 1 | 1 | 1 | 0.753 | 0.95 | 0.57 |
| 60 | | 1 | 1 | 1 | 1 | 0.797 | 0.96 | 0.56 |
| 70 | | 1 | 1 | 1 | 1 | 0.829 | 0.97 | 0.56 |

TABLE 26-continued

| Theta | % Fill | C1 | C2 | C3 | C4 | C5 | Average | Sq. Error |
|---|---|---|---|---|---|---|---|---|
| 80 | | 1 | 1 | 1 | 1 | 0.836 | 0.97 | 0.56 |
| 90 | | 1 | 1 | 1 | 1 | 0.836 | 0.97 | 0.56 |

As discussed more fully hereinafter, the numbers in the "Square Error" columns in the above tables relate the following exemplary measured set of reference capacitance values (scaled between zero and one) to the respective set of reference capacitance values at each theta and percent fill.

$C1=0.908$ $C2=0.307$ $C3=0$ $C4=0$ $C5=0$

A "measured" set of values refers to the measured capacitances or percentages of contact of the zones at a particular fill and spatial orientation which the previously derived or obtained "reference" values thereof contained in the tables are used to determine.

An examination of Tables 15 to 26 reveals that each volume percentage and spatial orientation has a unique set of capacitances or coverage values relative to other volume percentages, i.e., different from each of the sets in the tables for other volume percentages. In addition to the cylindrical configuration, other geometric configurations may also provide such unique sets of values. Thus, by determining a set of capacitance values in the reference database for a container which most closely approximates a set of measured values so as to be a "best fit", one may be assured of having correctly approximated the percentage volume of liquid in the container. While the spatial orientation may also be approximated from the measured values when compared to the reference values in the database, the accuracy of predicting the spatial orientation may be less at some ranges of fill level. For example, for the 35 percent fill Table 20, the same set of reference values applies to spatial orientations between 60 and 90 degrees. However, closer approximations of spatial orientations as well as percentage volumes may be obtained as the number of zones (capacitors) is increased.

It may be desired that an alarm be set to sound when the volume reaches a certain percentage such as 27.5 percent.

It should be noted that there may be some spacing axially between the capacitors. In order to provide improved accuracy in the neighborhood of the percentage volume at the alarm point or other critical point, the number of capacitors is preferably selected so that this percentage volume is well within the range of one of the zones. Thus, for the embodiment shown in the drawings, one of the 5 capacitors would generally cover a zone of 20 to 40 percent fill when the container is vertical, and the percentage fill (27.5 percent) at which the alarm is set to sound is well within this range. For the same reasons, it should be noted that a greater number of tables of reference values are closely distributed around the 27.5 percent range at which an alarm is to sound and below which it may be considered important that the percentage volume not be substantially reduced. The number of reference data sets around the alarm point is increased, such as by providing data sets at 22.5, 25, 27.5, and 30 percents for a 27.5 percent alarm point, to also improve accuracy.

For the case of cryogenic liquids, such as a liquid mixture of oxygen and nitrogen, it is considered important, as previously discussed, to provide for temperature measurements and measurements of the oxygen/nitrogen mix and the like to correct for the dependence of the dielectric coefficient on temperature, oxygen/nitrogen mix, and any other variables to be desirably corrected for improved accuracy in accordance with principles commonly known in the art to which this invention pertains.

Figure 8:
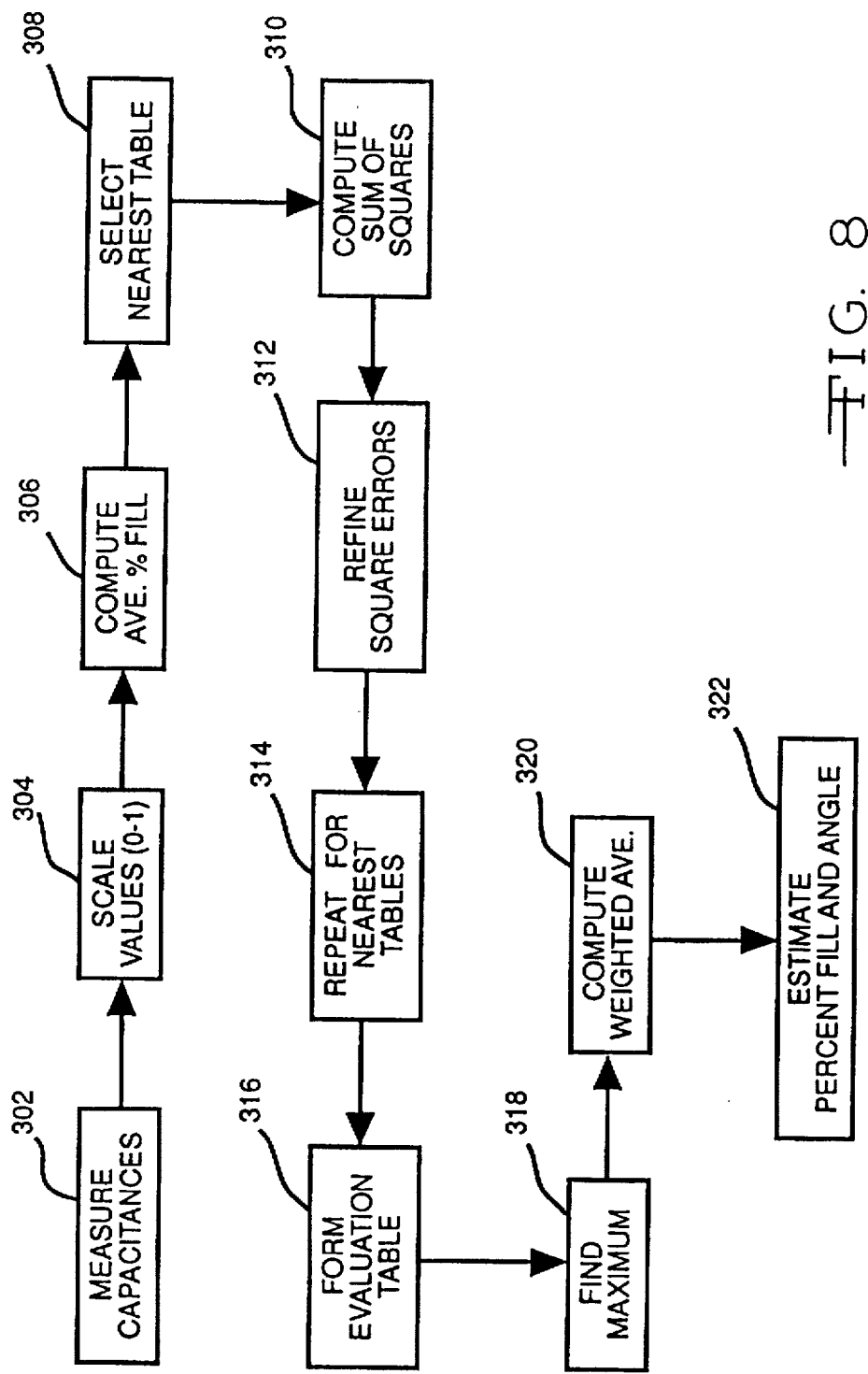
FIG. 8 is a flow chart of a process embodying the present invention for utilizing measured percentages of conductive band or zonal contact to estimate the percentage fill and the spatial orientation of a container.

Referring to FIG. 8, there is shown a flow diagram of a preferred process of utilizing the measured capacitances or percentages of contact, indicated at 302, to estimate the percentage fill or volume and the angle of spatial orientation, indicated at 322. As previously discussed and as indicated at 304, the measured values are first scaled between zero and one.

Since the portable container 10 may be carried, for example, by a fire fighter and may therefore be self-contained, the capacity of the small micro-processor 86 for performing the calculations may be limited. It may therefore be a strain on the micro-processor 86 to perform the computations described hereinafter for all of the percent fills between 0 and 100 percent. In order to reduce the number of percent fills on which computations must be performed, in accordance with a preferred embodiment of the present invention, an average percent fill is computed, as indicated at 306, and the computations hereinafter described are performed only on the percent fill table nearest to the computed average percent fill and on the percent fill tables, perhaps two higher and two lower, nearest thereto, as indicated at 308 and 314 respectively. The number of percent fill tables on which the computations are performed may of course be increased or decreased as considered necessary to improve accuracy of data interpolation or to decrease required microprocessor capacity.

The average percent fill is computed by adding the scaled measured values and dividing the sum by the number of measured values, i.e., the number of zones. Thus, for example, if the average of the scaled measured values is 0.63 representing a 63 percent fill, then the nearest of the above Table 23 is the 60 percent fill table and two tables on either side thereof include the 40, 50, 70, and 80 percent fill Tables 21, 22, 24 and 25, respectively. These would be the tables on which the hereinafter described computations would be performed thereby allowing the required micro-processor capacity to be reduced, and the computations would not be performed on the remaining tables. With a rough estimate for percent fill of 63 percent fill, through the mathematical modeling it can be concluded that the actual percent fill would be somewhere between 40 and 80 percent.

For another example, the average percent fill for the five measured capacitance values for which the square error in the above tables is computed may be calculated to be (0.908+0.307+0+0+0)÷5 =0.24 which indicates the percent fill to be around 24 percent, i.e., between 10 and 40 percent. However, if desired, the step of computing the average percent fill could be eliminated and the hereinafter described computations performed on all of the percent fill tables.

To obtain a comparative number which represents the relative degree of closeness or similarity between the measured set of values and one of the reference sets of values for the range of percent fills identified (i.e., 40 to 80 percent for the 63 percent average fill example or 10 to 40 percent for the 24 percent average fill example) and various spatial orientations or angles of inclination and which can be compared in size to other such comparative numbers obtained, the sum of the squares of the differences (error) between the reference zonal values and the corresponding measured values is computed, as illustrated at 310. Such a comparative number is obtained for each angle in each percent fill table for which the computations are to be performed. This provides a sensitive method of comparing the measured and reference data.

Since it is the relative values of the comparative numbers that are to be used in the further computations, these comparative numbers or square errors may be acted on mathematically as long as the relativeness of the values remain unaltered. In order to refine these square error numbers to prevent possible divide by zero errors as well as to increase contrast, a small constant is added to the sum of the squares and the resultant sum is then divided into another constant such as, for example, one, and the square root taken, as indicated at 312, and all of the resulting comparative numbers then compared by the micro-processor 86 or entered into an evaluation table or tables for comparison, as indicated at 316. It is these refined square error numbers that are contained in the tables. For example, for an angle of inclination of 0 degrees and a percent fill of 10 percent and for the exemplary capacitance values from which the square errors for the above tables was attained, the sum of the squares of the differences between the reference zonal values and the corresponding measured values is computed as $(0.908-0.146)^2+(0.307-0.146)^2+(0.146-0)^2+(0.146-0)^2+(0.146-0)^2$ which equals 0.581+0.026+0.021+0.021+0.021 which equals 0.670. Adding a small constant such as 0.01 and dividing the sum into 1 and taking the square root results in the relative number 1.21 (square error), which is shown in the last column of the 10 percent fill table at the 0 degree inclination angle. It should be understood that the sum of the squares may be acted on mathematically in suitable alternative ways as long as the relativeness of the values remains unchanged.

The following is an illustration of the best fit evaluation Table 27 wherein the comparative square error numbers are entered for seven fill percentages between 10 and 40 percent and for every 10 degrees of container inclination between horizontal (0 degrees) and vertical (90 degrees).

BEST FIT EVALUATION TABLE 27

| | Percent Fill | | | | | | |
|---|---|---|---|---|---|---|---|
| Angle | 10.00 | 20.00 | 25.00 | 27.50 | 30.00 | 35.00 | 40.00 |
| 0.00 | 1.21 | 1.25 | 1.23 | 1.21 | 1.19 | 1.15 | 1.11 |
| 10.00 | 1.68 | 1.92 | 1.86 | 1.80 | 1.74 | 1.62 | 1.48 |
| 20.00 | 1.66 | 2.58 | 2.84 | 2.82 | 2.70 | 2.38 | 2.03 |
| 30.00 | 1.56 | 2.81 | 4.24 | 5.08 | 5.02 | 3.34 | 2.19 |
| 40.00 | 1.45 | 2.86 | 6.15 | 9.02 | 6.88 | 3.38 | 2.07 |
| 50.00 | 1.36 | 2.89 | 5.88 | 8.98 | 7.69 | 3.03 | 1.91 |
| 60.00 | 1.29 | 2.81 | 4.88 | 6.77 | 7.24 | 2.90 | 1.78 |
| 70.00 | 1.24 | 2.78 | 4.10 | 5.60 | 7.24 | 2.90 | 1.68 |
| 80.00 | 1.23 | 2.78 | 3.55 | 5.50 | 7.24 | 2.90 | 1.61 |
| 90.00 | 1.23 | 2.78 | 3.34 | 5.50 | 7.24 | 2.90 | 1.60 |

Since the comparative numbers in the above best fit Table 27 were obtained by dividing into one and taking the square root, the highest comparative numbers represent sets of square error values closest or most similar to the set of measured values. Thus, the evaluation table is reviewed or scanned by the micro-processor 86 to locate the most frequent maximum comparative number, as indicated at 318. In this example, the maximum comparative number is 9.02 which is at 27.5 percent fill and an angle of 40 degrees. Although a more precise best fit may be obtained as described hereinafter, an estimated percent fill of 27.5 percent may be said to be a best fit. If the corresponding comparative numbers for 30 and 50 degrees were substantially less, one may be assured that the spatial orientation is approximately 40 degrees, and this spatial orientation may also be included in the best fit.

If the step of adding a small constant to the sum of the squares and dividing into one and taking the square root is dispensed with, which would reduce accuracy, then the resulting evaluation table should be reviewed to locate the smallest or least comparative number, and this smallest comparative number would in this case represent the set of reference values closest or most similar to the set of measured values.

It should be noted that the next highest maximum comparative number in the above best fit evaluation table of 8.98 occurs at a 50 degree angle and a 27.5 percent fill. This indicates that the percent fill is closer to a 27.5 percent fill. To compute a more precise best fit, the weighted average (based on the comparative values on both corresponding sides of the maxima for the percent fill and for the angle) is computed, as indicated at 320. The weighted average for the percent fill is thus computed by multiplying the table value (square error) by the corresponding percent fill for the nearest table value neighbor or neighbors on each side of the peak value at the particular angle and summing the results. This sum is then divided by the sum of the table value neighbors used to obtain the summed results to give the weighted percent fill. Likewise, the weighted average for the angle is computed by multiplying the table value (square error) by the corresponding angle for the nearest table value neighbor or neighbors on each side of the peak value at the particular percent fill and summing the results. This sum is then divided by the sum of the table value neighbors used to obtain the summed results to give the weighted angle. Therefore, the best fit in this example may more precisely be determined as follows. For the percent fill, wherein the table values are 6.15 and 6.88 at the nearest percent fill neighbors 25 and 30 percent respectively:

$$\frac{25(6.15) + 30(6.88)}{6.15 + 6.88} = \text{approximately 27.6 precent fill}$$

For the angle, wherein the table values are 5.08 and 8.98 at the nearest angle neighbors 30 and 50 degrees respectively:

$$\frac{30(5.08) + 50(8.98)}{5.08 + 8.98} = \text{approximately 43 degrees}$$

Thus, the best fit in this example may be said to be approximately at a 27.6 percent fill and 43 degree spatial orientation. Interpolation by weighted averaging in the region of best fit can provide, as indicated at 322, a robust and accurate estimate of the fill and angle parameters. Thus, building a two-dimensional array of error values allows interpolation and a more robust estimate (best fit) of the percent fill and angle parameters.

Since the average percent fill was computed to be 27.6 percent, this same result would have been obtained if comparative numbers were generated only for the 25, 27.5, and 30 percent fill Tables 17 to 19 and would have required substantially less micro-processor capacity.

Figure 9:
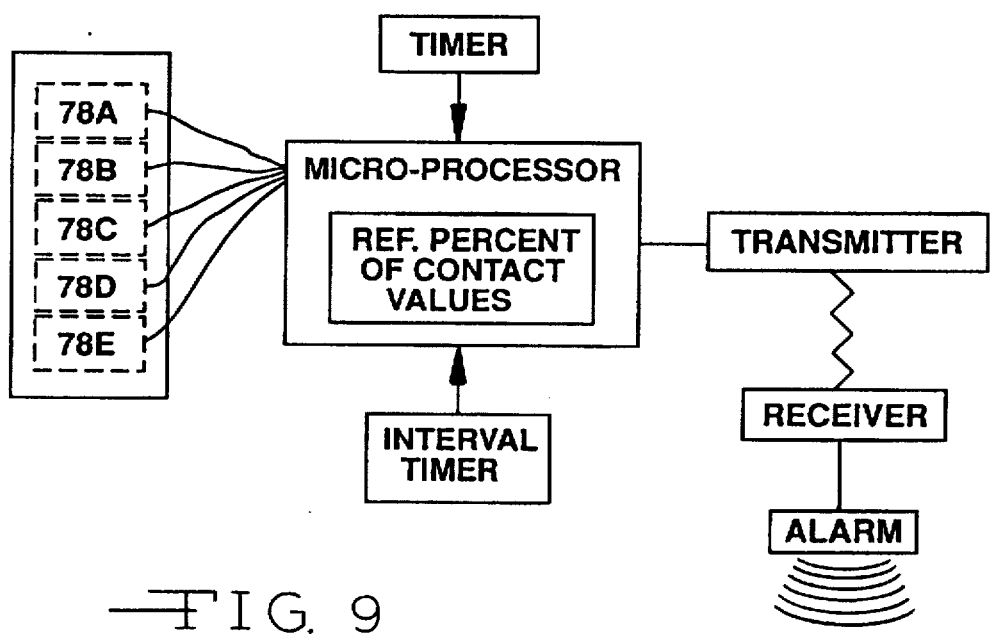
FIG. 9 is a block diagram of apparatus for sensing lack of motion of the container.

During normal use in fighting fires and the like, the container 10 will assume various inclinations. However, when the user has become incapacitated and is thus "down", the container inclination should normally remain substantially constant although the volume of liquid 16 therein may decline due to continued breathing of the person or its rapid escape from the container if the facepiece 22 is removed. For example, a Dewar container may lose liquid at a rate of as much as perhaps 400 liters per minute if there is a removed mask. In order to detect a substantially constant angle of orientation of the container 10 irregardless of its volume over a predetermined period of time such as perhaps 20 seconds sufficient to conclude that a person is "down," in accordance with the present invention, the reference percentage of contact values are used to determine an approximate angle or angles of inclination of the container 10 for each of a plurality of perhaps 3 or more times during the predetermined period of time. Such a motion sensor mechanism indicative of "man down" may be (but is not required to be) incorporated with the Dewar container 10, utilizing its conductive bands or zones 78A to 78E for monitoring container inclination and thereby sensing lack of motion as well as for sensing the quantity of liquid in the container, as illustrated in FIG. 9. Thus, the measured and suitably processed percentage of contact values from zones 108A to 108E are routed via capacitance-to-voltage converters 84A to 84E respectively to a motion sensor mechanism, illustrated generally at 400, which includes a micro-processor 402, which may be the same as micro-processor 86 in FIG. 6, which receives the signals via a multiplexer and an analogue-to-digital converter, indicated at 401 and 403 respectively, and which compares these values with the reference sets of values, illustrated at 404, which have been previously inputted therein, to obtain an angle of inclination value.

Similarly as illustrated in FIG. 6, electrical power is provided by a battery 409 connected to a battery test circuit, indicated at 407, tied in with micro-processor 402, which regulates the distribution of power via a power transmission cable 405 tied to multiplexer 401, A/D converter 403, and in turn micro-processor 402.

Micro-processor 402 is suitably programmed, in accordance with principles commonly known to those of ordinary skill in the art to which this invention pertains, to provide a timer means 406 for triggering the obtaining of an angle of inclination value at each of specified time intervals, the micro-processor being programmed to compare the angle of inclination values thusly obtained over the predetermined period of time and is further programmed to cause a transmitter 408 to transmit a signal, illustrated at 410, to a receiver 412 for signalling an alarm device 414 to, for example, sound if an angle of inclination value obtained at each time is substantially the same as an angle of inclination value obtained at each of the other times, i.e., within a certain predetermined range or window. For example, at 50 percent fill, the values for C1 to C5 of 0.707, 0.598, 0.5, 0.402, and 0.293 respectively indicate that the angle of inclination is approximately 10 degrees. At 40 percent fill, the values for C1 to C5 of 0.624, 0.524, 0.428, 0.323, and 0.183 respectively also indicate an angle of inclination of approximately 10 degrees. At a 35 percent fill, the values for C1 to C5 of 0.585, 0.487, 0.389, 0.276, and 0.095 respectively also indicate an angle of inclination of 10 degrees. If the readings obtained continue to indicate an angle of inclination of approximately 10 degrees for each of the times, it may be concluded that there is a lack of motion so that the micro-processor would then be programmed to effect the transmission of signal 410. Since the angle of inclination is a parameter which is derived from the zonal readings, the difference or lack of difference in zonal capacitance measurements at a plurality of times may alternatively be used for sensing lack of motion. Alternatively, the microprocessor may be programmed to initially merely signal the user and to thereafter transmit a signal to others only after lack of motion is sensed over a preselected longer period of time.

The alarm 144 of FIG. 6 may be used as the alarm device 414 in which event the alarm 144 may be suitably provided to emit a detectable signal to indicate lack of motion which is different from the signal emitted to indicate a low level of cryogenic liquid.

Where the values indicate a wide angle of inclination range (for example, see the values for 50 to 90 degrees at 50 percent fill), it may still be desirable to effect transmission of the "man down" signal if each of a set of readings over the period of time is not inconsistent with a particular angle of inclination since it may be considered desirable to err on the side of safety. However, as the number of capacitor plates is increased, such broad ranges will narrow for greater preciseness. The microprocessor 402 is further programmed to provide a resettable timer means 416 which resets the micro-processor 402 after the predetermined period of time to start a new comparison. By "a plurality of times," as used herein and in the claims, is meant to include a continuous obtaining and comparing of the angle of inclination values over the predetermined period of time. Thus, the motion sensor 400 may comprise the interval timer 406 or other suitable means which allows either periodic or continuous comparison of the angle of inclination values. The circuitry for the motion sensor 400 may be provided using principles commonly known to those of ordinary skill in the art to which this invention pertains. Alternatively, the functions of the micro-processor 402 including the timer means 416 and interval timer means 406 may be implemented with mechanical devices.

Reference is made to the simultaneously filed patent application entitled "Method And Apparatus For Determining The Quantity Of a Liquid In A Container Independent Of Its Spacial Orientation", Ser. No. 08/406,695, Motion Sensor and Method" which is assigned to the assignee of the present invention and incorporated herein by reference.

It can thus be seen that the present invention provides a sensor apparatus and method for detecting and indicating the level of liquid in a container such as a cryogenic liquid Dewar container independent of the physical motions acting on the container and independent of the spatial orientation of the container. Further, the present invention provides a sensor apparatus and method for detecting and sensing the spatial orientation of the container independent of the volume of liquid therein so as to initiate a "man-down" alarm.

It is intended that the foregoing description only be illustrative of the present invention and that the present invention is limited only by the hereafter appended claims. For example, there may be various ways of determining a best fit other than as specifically described herein, and such other ways are meant to come within the present invention as defined by the appended claims.

What is claimed is:

1. A method for sensing at least one of the volume of a liquid in a container independent of its spatial orientation and the spatial orientation of the container independent of the volume of the liquid therein, wherein the container comprises an enclosed surrounding side wall divided into a plurality of zones, comprising the steps of:

a. providing the container having a plurality of capacitors corresponding to the plurality of zones wherein the capacitors comprise first and second conductors with the first conductor provided by a plurality of continuous first conductive members disposed in a proximately spaced and parallel relationship with respect to the second conductor provided by the surrounding side wall to divide the container into the plurality of zones, and wherein the liquid in the container is capable of flowing freely between the first and second conductors to serve at least partially as a dielectric therefor;

b. measuring the percentage of contact by the liquid of each of the plurality of zones into which the container is divided corresponding to the capacitance of each of the plurality of capacitors; and c. comparing the set of measured percentages of contact to a plurality of sets of reference percentage of contact values for the container at various volume percentages and spatial orientations to select a volume percentage and/or spatial orientation which is a best fit to the set of measured percentages of contact.

2. A method according to claim 1 wherein the container is an elongate cylindrical container which is axially divided into the zones over the length thereof, the method comprising operating a computer thereby computing the sum of the differences or the sum of the squares of differences between the reference percentage of contact values and the corresponding measured percentages of contact for each of the plurality of sets of reference percentage of contact values wherein a best fit is a volume percentage and/or spatial orientation at which the computed sum of differences or sum of the squares of differences is the least.

3. A method according to claim 1 wherein the container is an elongate cylindrical container which is axially divided into the zones over the length thereof, the method comprising operating a computer thereby computing an average volume percentage and further operating the computer thereby computing the sum of the squares of differences between the reference percentage of contact values and the corresponding measured percentages of contact for each of the plurality of sets of reference percentage of contact values for a preselected number of volume percentages closest to the computed average volume percentage whereby the sum of the squares computations are not made for the sets of reference percentage of contact values for all of the volume percentages for which sets of reference percentage of contact values are available and wherein a best fit is a volume percentage at which the computed sum of the squares is the least.

4. A method according to claim 1 wherein the container is an elongate cylindrical container which is axially divided into the zones over the length thereof, the method comprising operating a computer thereby scaling the measured percentages of contact to create an uncontacted value as zero and a fully contacted value as one, the sets of reference percentage of contact values also being scaled so that an uncontacted value is zero and a fully contacted value is one, computing the average volume percentage by adding the scaled measured percentages of contact and dividing the sum by the number of zones, computing the sum of the squares of differences between the scaled reference percentage of contact values and the scaled corresponding measured percentages of contact for each of the plurality of sets of scaled reference percentage of contact values for the volume percentage closest to the computed average volume percentage and for a plurality of volume percentages both less than and greater than said closest volume percentage, adding a constant to each sum of squares and dividing into another constant and taking the square root to obtain a comparative number wherein a best fit is a volume percentage at which the computed comparative number is the greatest.

5. A method according to claim 4 further comprising computing from the comparative numbers which are neighbors to the greatest comparative number a weighted average volume percentage to obtain a closer best fit.

6. A method according to claim 5 further comprising computing from the comparative numbers which are neighbors to the greatest number a weighted average spatial orientation.

7. A method according to claim 1 wherein the step of measuring the percentages of contact comprises providing the container to have a plurality of capacitors for the plurality of zones respectively wherein liquid in the container is capable of flowing freely between plates of each capacitor to serve at least partially as a dielectric therefor and measuring the capacitance of each of the capacitors.

8. A method for sensing at least one of the volume of a liquid in a container independent of its spatial orientation and the spatial orientation of the container independent of the volume of the liquid therein, wherein the container comprises an enclosed, surrounding side wall divided into a plurality of zones, comprising the steps of:
   a) measuring the percentage of contact by the liquid of each of the plurality of zones into which the container is divided; and
   b) computing the sum of the squares of differences between a reference percentage of contact values and a corresponding measured percentages of contact for each of the plurality of sets of reference percentage of contact values for the container at various volume percentages and spatial orientations to select a volume percentage and/or spatial orientation which is a best fit to the set of measured percentages of contact, wherein the best fit is a volume percentage and/or spatial orientation at which the computed sum of the squares is the least.

9. A method for sensing at least one of the volume of a liquid in a container independent of its spatial orientation and the spatial orientation of the container independent of the volume of the liquid therein, wherein the container comprises an enclosed, surrounding side wall divided into a plurality of zones, comprising the steps of:
   a) measuring the percentage of contact by the liquid of each of a plurality of the zones into which the container is divided; and
   b) operating a computer thereby computing an average volume percentage by adding the measured percentages of contact and dividing the sum by the number of zones and further operating the computer thereby computing the sum of the squares of differences between the reference percentage of contact values and the corresponding measured percentages of contact for each of the plurality of sets of reference percentage of contact values for a preselected number of volume percentages closest to the computed average volume percentage whereby the sum of the squares computations are not made for the sets of reference percentage of contact values for all of the volume percentages for which sets of reference percentage of contact values are available for the container at various volume percentages and spatial orientations to thereby select a volume percentage and/or spatial orientation which is a best fit to the set of measured percentages of contact, wherein a best fit is a volume percentage at which the computed sum of the squares is the least.

10. A method for sensing at least one of the volume of a liquid in a container independent of its spatial orientation and the spatial orientation of the container independent of the volume of the liquid therein, wherein the container comprises an enclosed, surrounding side wall divided into a plurality of zones, comprising the steps of:
    a) measuring the percentage of contact by the liquid of each of the plurality of zones into which the container is divided; and
    b) operating a computer thereby scaling the measured percentages of contact to create an uncontacted value as zero and a fully contacted value as one, a plurality of sets of reference percentages of contact values also being scaled so that an uncontacted value is zero and a fully contacted value is one, computing the average volume percentage by adding the scaled measured percentages of contact and dividing the sum by the number of zones, computing the sum of the squares of differences between the scaled reference percentage of contact values and the scaled corresponding measured percentages of contact for each of the plurality of sets of scaled reference percentage of contact values for the volume percentage closest to the computed average volume percentage and for a plurality of volume percentages both less than and greater than said closest volume percentage, adding a constant to each sum of squares and dividing into another constant and taking the square root to obtain a comparative number for the container at various volume percentages and spatial orientations to select a volume percentage and/or spatial orientation which is a best fit to the set of measured percentages of contacts wherein the best fit is a volume percentage at which the computed comparative number is the greatest.

11. The method according to claim 10 further comprising computing from the comparative numbers which are neighbors to the greatest comparative number a weighted average volume percentage to obtain a closer best fit.

12. The method according to claim 11 further comprising computing from the comparative numbers which are neighbors to the greatest number a weighted average spatial orientation.

13. A method of sensing the volume of a liquid in and/or spatial orientation of an elongate cylindrical container, comprising the steps of:
    a) measuring the percentage of contact by the liquid of each of a plurality of zones into which the container is divided; and
    b) computing the sum of the squares of differences between the reference percentage of contact values and a corresponding measured percentages of contact for each of a plurality of sets of reference percentage of contact values for the container at various volume percentages and spatial orientations to select a volume percentage and/or spatial orientation which is a best fit to the set of measured percentages of contact, wherein the best fit is a volume percentage and/or spatial orientation at which the computed sum of the squares is the least.

14. A method of sensing the volume of a liquid in and/or spatial orientation of an elongate cylindrical container, comprising the steps of:
    a) measuring the percentage of contact by the liquid of each of a plurality of zones into which the container is divided; and
    b) operating a computer thereby computing an average volume percentage by adding the measured percentages and dividing the sum by the number of zones and further operating the computer thereby computing the sum of the squares of differences between the reference percentage of contact values and the corresponding measured percentages of contact for each of the plurality of sets of reference percentage of contact values for a preselected number of volume percentage whereby the sum of the squares computations are not made for the sets of reference percentage of contact values for all of the volume percentages for which sets of reference percentage of contact values are available for the container at various volume percentages and spatial orientations to select a volume percentage and/or spatial orientation which is a best fit to the set of measured percentages of contact, wherein a best fit is a volume percentage and spatial orientation at which the computed sum of the squares is the least.

15. A method of sensing the volume of a liquid in and/or spatial orientation of an elongate cylindrical container, comprising the steps of:
 a) measuring the percentage of contact by the liquid of each of a plurality of zones into which the container is divided; and
 b) operating a computer thereby scaling the measured percentages of contact to create an uncontacted value as zero and a fully contacted value as one, a plurality of sets of reference percentages of contact values also being scaled so that an uncontacted value is zero and a fully contacted value is one, computing an average volume percentage by adding the scaled measured percentages of contact and dividing the sum by the number of zones, computing the sum of the squares of differences between the scaled reference percentage of contact values and the corresponding scaled measured percentages of contact for each of the plurality of sets of scaled reference percentage of contact values for the volume percentages closest to the computed average volume percentage and for a plurality of volume percentages less than and greater than said closest volume percentage, and adding a constant to each sum of squares and dividing into another constant and taking the square root to obtain a comparative number for the container at various volume percentages and spatial orientations to select a volume percentage and/or spatial orientation which is a best fit to the set of measured percentages of contact, wherein the best fit is a volume percentage and spatial orientation at which the computed comparative number is the greatest.

16. Apparatus for sensing at least one of the volume of a liquid in a container independent of its spatial orientation and the spatial orientation of the container independent of the volume of the liquid therein, wherein the container comprises an enclosed, surrounding side wall divided into a plurality of zones, comprising means for measuring the percentage of contact by the liquid of each of a plurality of zones into which the container is divided and means including a computer for computing the sum of the squares of differences between the reference percentage of contact values and the corresponding measured percentages of contact for each of a plurality of sets of reference percentage of contact values and the computer means having a database for comparing the set of measured percentages of contact to a plurality of sets in the database of reference percentage of contact values for the container at various volume percentages and spatial orientations to select a volume percentage and/or spatial orientation which is a best fit to the set of measured percentages of contact, wherein the best fit is a volume percentage and/or spatial orientation at which the computed sum of the squares is the least.

17. Apparatus for sensing at least one of the volume of a liquid in a container independent of its spatial orientation and the spatial orientation of the container independent of the volume of the liquid therein, wherein the container comprises an enclosed, surrounding side wall divided into a plurality of zones, comprising means for measuring the percentage of contact by the liquid of each of a plurality of zones into which the container is divided and means including a computer for scaling the measured percentages of contact to create an uncontacted value as zero and a fully contacted value as one, the sets of reference percentage of contact values also being scaled so that an uncontacted value is zero and a fully contacted value is one, and wherein an average volume percentage is determinable by adding the scaled measured percentages of contact and dividing the sum by the number of zones and wherein the sum of the squares of differences between the scaled reference percentage of contact values and the corresponding scaled measured percentages of contact for each of the plurality of sets of scaled reference percentage of contact values for a preselected number of volume percentages closest to the computed average volume percentage is determinable whereby the sum of the squares computations are not made for the sets of scaled reference percentage of contact values for all of the volume percentages for which sets of scaled reference percentage of contact values are available, and the computer means having a database for comparing the set of measured percentages of contact to a plurality of sets in the database of reference percentage of contact values for the container at various volume percentages and spatial orientations to select a volume percentage and/or spatial orientation which is a best fit to the set of measured percentages of contact, wherein a best fit is a volume percentage at which the computed sum of the squares is the least.

18. Apparatus for sensing at least one of the volume of a liquid in a container independent of its spatial orientation and the spatial orientation of the container independent of the volume of the liquid therein, wherein the container comprises an enclosed, surrounding side wall divided into a plurality of zones, the sensing means comprising means for measuring the percentage of contact by the liquid of each of the plurality of zones into which the container is divided and means including a computer for scaling the measured percentages of contact to create an uncontacted value as zero and a fully contacted value as one, the set of reference percentage of contact values also being scaled so that an uncontacted value is zero and a fully contacted value is one, and wherein an average volume percentage is determined by adding the scaled measured percentages of contact and dividing the sum by the number of zones, and wherein the sum of the squares of differences between the scaled reference percentage of contact values and the corresponding scaled measured percentages of contact for each of the plurality of sets of scaled reference percentage of contact values is determined for the volume percentage closest to the computed average volume percentage and for a plurality of volume percentages both less than and greater than said closest volume percentage, wherein a constant is added to each sum of squares and divided into another constant and taking the square root to obtain a comparative number and the computer means having a database for comparing the set of measured percentages of contact to a plurality of sets in the database of reference percentage of contact values for the container at various volume percentages and spatial orientations to select a volume percentage and/or spatial orientation which is a best fit to the set of measured percentages of contact, wherein a best fit is a volume percentage at which the computed comparative number is the greatest.

19. Apparatus for sensing at least one of the volume of a liquid in a container independent of its spatial orientation and the spatial orientation of the container independent of the volume of the liquid therein comprising a plurality of band-shaped capacitors spaced axially over the length of the container and disposed co-axially of the container and extending circumferentially adjacent to an inner wall thereof to divide the container into zones provided by the capacitors and including means for receiving liquid in the container between the band-shaped capacitors to serve at least partially as a dielectric therefor and further comprising means for measuring the capacitance of each of said capacitors to thereby determine the percentage of contact of the liquid with the zones and means including a computer having a database for comparing the set of measured percentages of contact to a plurality of sets in the database of reference percentage of contact values for the container at various volume percentages and spatial orientations to select a volume percentage and/or spatial orientation which is a best fit to the set of measured percentages of contact.

20. Apparatus according to claim 19 wherein the capacitors are sized to cover substantially the entirety of the container inner wall.

21. In a breathing apparatus including a container for cryogenic liquid, means for sensing the volume of the liquid in the container independent of its spatial orientation and/or spatial orientation of the container independent of volume of liquid therein, wherein the container is an elongate cylindrical container which is axially divided into a plurality of zones over the length thereof, the sensing means comprising means for measuring the percentage of contact by the liquid of each of the plurality of zones into which the container is divided and means including a computer having a database for comparing the set of measured percentages of contact to a plurality of sets in the database of reference percentage of contact values for the container at various volume percentages and spatial orientations to determine the sum of the squares of differences between the reference percentage of contact values and the corresponding measured percentages of contact for each of the sets of reference percentage of contact values to select a volume percentage and/or spatial orientation which is a best fit to the set of measured percentages of contact, wherein a best fit is a volume percentage and/or spatial orientation at which the computed sum of the squares is the least.

22. In a breathing apparatus including a container for cryogenic liquid, means for sensing the volume of the liquid in the container independent of its spatial orientation and/or spatial orientation of the container independent of the volume of liquid therein, wherein the container is an elongate cylindrical container which is axially divided into a plurality of zones over the length thereof, the sensing means comprising means for measuring the percentage of contact by the liquid of each of the plurality of zones into which the container is divided and means including a computer for scaling the measured percentages of contact to create an uncontacted value as zero and a fully contacted value as one, the computer means having a database for comparing the set of measured percentages of contact to a plurality of sets in the database of reference percentage of contact values for the container at various volume percentages and spatial orientations, the sets of reference percentage of contact values also being scaled so that an uncontacted value is zero and a fully contacted value is one, means for computing an average volume percentage by adding the scaled measured percentages of contact and dividing the sum by the number of zones, and means for computing the sum of the squares of differences between the scaled reference percentage of contact values and the corresponding scaled measured percentages of contact for each of the plurality of sets of scaled reference percentage of contact values for a preselected number of volume percentages closest to the computed average volume percentage whereby the sum of the squares computations are not made for the sets of scaled reference percentage of contact values for all of the volume percentages for which sets of scaled reference percentage of contact values are available to thereby select a volume percentage and/or spatial orientation which is a best fit to the set of measured percentages of contact, and wherein a best fit is a volume percentage at which the computed sum of the squares is the least.

23. In a breathing apparatus including a container for cryogenic liquid, means for sensing the volume of the liquid in the container independent of its spatial orientation and/or spatial orientation of the container independent of the volume of liquid therein, wherein the container is an elongate cylindrical container which is axially divided into a plurality of zones over the length thereof, the sensing means comprising means for measuring the percentage of contact by the liquid of each of a plurality of zones into which the container is divided and means including a computer for scaling the measured percentages of contact to create an uncontacted value as zero and a fully contacted value as one, the computer means having a database for comparing the set of measured percentages of contact to a plurality of sets in the database of reference percentage of contact values for the container at various volume percentages and spatial orientations, the set of reference percentage of contact values also being scaled so that an uncontacted value is zero and a fully contacted value is one, means for computing an average volume percentage by adding the scaled percentages of contact and dividing the sum by the number of zones, means for computing the sum of the squares of differences between the scaled reference percentage of contact values and the corresponding scaled measured percentages of contact for each of the plurality of sets of scaled reference percentage of contact values for the volume percentage closest to the computed average volume percentage and for a plurality of volume percentages less than and greater than said closest volume percentage, and means for adding a constant to each sum of squares and dividing into another constant and taking the square root to obtain a comparative number to thereby select a volume percentage and/or spatial orientation which is a best fit to the set of measured percentages of contact, wherein a best fit is a volume percentage at which the computed comparative number is the greatest.

24. In a breathing apparatus including a container for cryogenic liquid, means for sensing the volume of the liquid in the container independent of its spatial orientation and/or spatial orientation of the container independent of the volume of liquid therein, the sensing means comprising a plurality of band-shaped capacitors spaced axially over the length of the container and disposed co-axially with the container and extending circumferentially adjacent to an inner wall thereof respectively for a plurality of zones into which the container is divided and including means for receiving the liquid in the container between said plates of said capacitors to serve at least partially as a dielectric therefor and further comprising means for measuring the capacitance of each of said capacitors and means including a computer having a database for comparing the set of measured percentages of contact to a plurality of sets in the database of reference percentage of contact values for the container at various volume percentages and spatial orientations to select a volume percentage and/or spatial orientation which is a best fit to the set of measured percentages of contact.

25. A method for sensing at least one of the volume of a liquid in a container and spatial orientation of the container, comprising the steps of:

a) sensing contact by the liquid with each of a plurality of zones into which the container is divided;

b) operating a computer thereby inputting to the computer information as to zones contacted by the liquid and computing therefrom at least one of the volume of the liquid in the container and spatial orientation of the container; and c) comparing a plurality of the computed spatial orientations for a plurality of times respectively over a predetermined period of time and signalling when all of the plurality of computed spatial orientations are substantially the same.

26. A method for sensing at least one of the volume of a liquid in a container independent of its spatial orientation and the spatial orientation of the container independent of the volume of the liquid therein, comprising the steps of:

a) measuring the percentage of contact by the liquid of each of a plurality of zones into which the container is divided;

b) comparing the set of measured percentages of contact to a plurality of sets of reference percentage of contact values for the container at various volume percentages and spatial orientations to select a volume percentage and/or spatial orientation which is a best fit to the set of measured percentages of contact; and c) comparing a plurality of the selected spatial orientations for a plurality of times respectively over a predetermined period of time and signalling when all of the plurality of selected spatial orientations are substantially the same.

27. A method of sensing the volume of a liquid in and/or spatial orientation of an elongate cylindrical container; comprising the steps of:

a) measuring the percentage of contact by the liquid of each of a plurality of zones respectively into which the container is divided axially over its length;

b) comparing the set of measured percentages of contact to a plurality of sets of reference percentage of contact values for the container at various volume percentages and spatial orientations to select a volume percentage and/or spatial orientation which is a best fit to the set of measured percentages of contact; and c) comparing a plurality of the selected spatial orientations for a plurality of times respectively over a predetermined period of time and signalling when all of the plurality of selected spatial orientations are substantially the same.

28. Apparatus for sensing the volume of a liquid in and/or spatial orientation of a container comprising means for sensing contact by the liquid with each of a plurality of zones into which the container is divided and computer means for receiving information from said sensing means as to the zones contacted by the liquid and for computing therefrom the volume of the liquid in and/or spatial orientation of the container, and further comprising means for comparing a plurality of the computed spatial orientations for a plurality of times respectively over a predetermined period of time and means for signalling when all of the plurality of computed spatial orientations are substantially the same.

29. Apparatus for sensing at least one of the volume of a liquid in a container independent of its spatial orientation and the spatial orientation of the container independent of the volume of the liquid therein, comprising means for measuring the percentage of contact by the liquid of each of a plurality of zones into which the container is divided and means including a computer having a database for comparing the set of measured percentages of contact to a plurality of sets in the database of reference percentage of contact values for the container at various volume percentages and spatial orientations to select a volume percentage and/or spatial orientation which is a best fit to the set of measured percentages of contact and further comprising means for comparing a plurality of the selected spatial orientations for a plurality of times respectively over a predetermined period of time and means for signalling when all of the plurality of selected spatial orientations are substantially the same.

30. In a breathing apparatus including a container for cryogenic liquid, means for sensing the volume of the liquid in the container independent of its spatial orientation and/or spatial orientation of the container independent of volume of liquid therein, comprising means for measuring the percentage of contact by the liquid of each of a plurality of zones into which the container is divided and means including a computer having a database for comparing the set of measured percentages of contact to a plurality of sets in the database of reference percentage of contact values for the container at various volume percentages and spatial orientations to select a volume percentage and/or spatial orientation which is a best fit to the set of measured percentages of contact and further comprising means for comparing a plurality of the selected spatial orientations for a plurality of times respectively over a predetermined period of time and means for signalling when all of the plurality of selected spatial orientations are substantially the same.

* * * * *